(12) United States Patent (10) Patent No.: US 8,600,283 B2
Kinoshita et al. (45) Date of Patent: Dec. 3, 2013

(54) METHOD OF COMPENSATING FOR ERRORS CAUSED BY A PRINT HEAD USING SKEW CORRECTION

(75) Inventors: Izumi Kinoshita, Hyogo (JP); Tatsuya Miyadera, Osaka (JP); Motohiro Kawanabe, Hyogo (JP); Takeshi Shikama, Osaka (JP); Susumu Miyazaki, Osaka (JP); Takuhei Yokoyama, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 26 days.

(21) Appl. No.: 13/444,018

(22) Filed: Apr. 11, 2012

(65) Prior Publication Data

US 2012/0262750 A1 Oct. 18, 2012

(30) Foreign Application Priority Data

Apr. 13, 2011 (JP) ................................. 2011-088926

(51) Int. Cl.
*G03G 15/00* (2006.01)
*G06F 3/12* (2006.01)
(52) U.S. Cl.
USPC ............................. 399/395; 358/1.13; 399/4
(58) Field of Classification Search
USPC ................. 358/3.13–3.2; 399/4, 395
See application file for complete search history.

(56) References Cited

U.S. PATENT DOCUMENTS

2010/0060938 A1* 3/2010 Kondoh ....................... 358/3.13
2012/0056961 A1 3/2012 Kinoshita et al.

FOREIGN PATENT DOCUMENTS

JP 2007-145001 6/2007
JP 2012-056111 3/2012

* cited by examiner

*Primary Examiner* — Eric A Rust
(74) *Attorney, Agent, or Firm* — IPUSA, PLLC

(57) ABSTRACT

An image forming apparatus includes plural image forming units of plural colors, each including a print head including plural LED chips aligned in a main scanning direction; a screen angle selecting unit that selects screen angles for the plural colors respectively based on the amounts of skew of the plural image forming units; an image processing unit that performs image processing on input data to be expressed by pixels of the plural colors such that the pixels of the colors have the corresponding screen angles selected by the screen angle selecting unit; a correction amount determining unit that determines a total amount of skew correction based on the amount of skew detected by the skew detection unit, and determines the amounts of skew correction in the sub-scanning direction for predetermined groups of the pixels, based on the total amount of skew correction, for each of the colors.

11 Claims, 21 Drawing Sheets

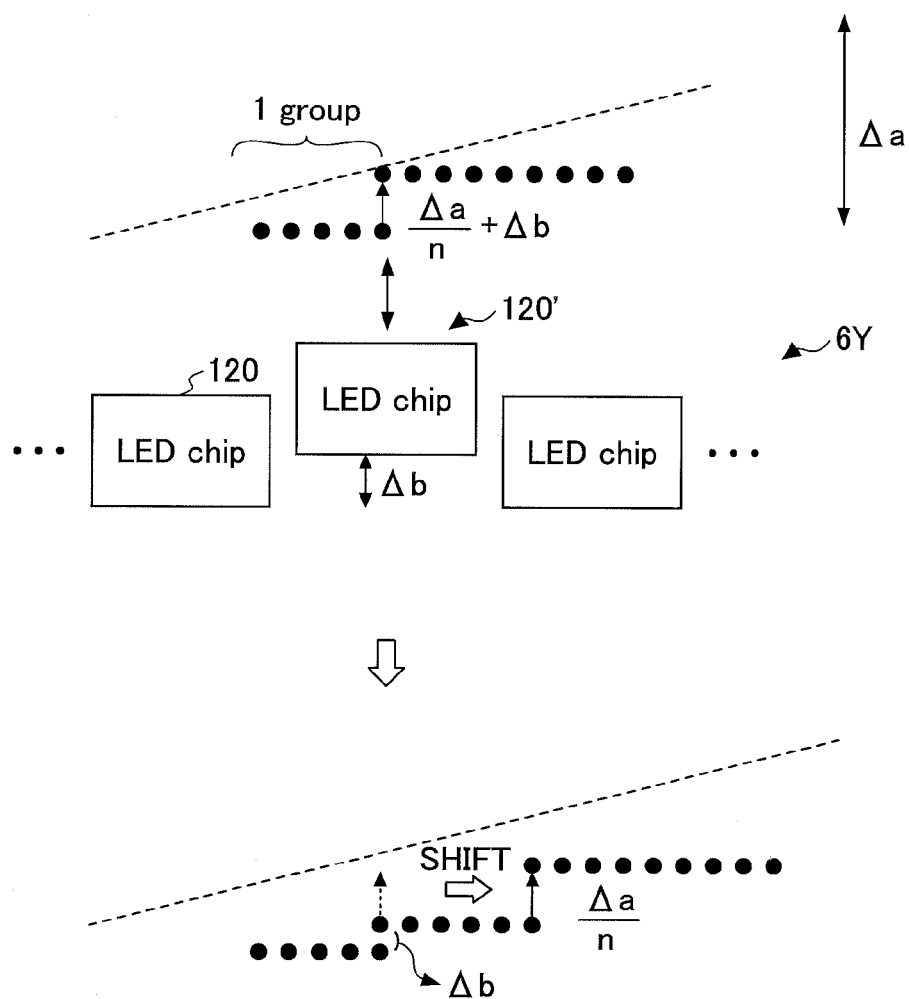

| Chip No. | 1 (120a) | | 2 (120b) | | 3 (120c) | | ... | 4 (120d) | |
|---|---|---|---|---|---|---|---|---|---|
| | 1st dot | 97th dot | 1st dot | 97th dot | 1st dot | 97th dot | | 1st dot | 97th dot |
| AMOUNT OF DISPLACEMENT (PITCH) | 0 | 0 | +3 | +3 | 0 | +2 | | 0 | 0 |

FIG.9A

| REGISTER NO. | BIT LENGTH | POSITION |
|---|---|---|
| reg1 | 2 | 25 |
| reg2 | 2 | 49 |
| reg3 | 2 | 73 |
| reg4 | 2 | 97 |
| reg5 | 2 | 121 |
| reg6 | 2 | 145 |
| reg7 | 2 | 169 |
| reg8 | 4 | 193 |
| reg9 | 2 | 217 |
| reg10 | 2 | 241 |
| reg11 | 2 | 265 |
| reg12 | 2 | 289 |
| reg13 | 2 | 313 |
| reg14 | 2 | 337 |
| reg15 | 2 | 361 |
| reg16 | 4 | 385 |
| reg17 | 2 | 409 |
| reg18 | 2 | 433 |
| reg19 | 2 | 457 |
| reg20 | 2 | 481 |
| reg21 | 2 | 505 |
| reg22 | 2 | 529 |
| reg23 | 2 | 553 |
| ⋮ | | |
| reg207 | 2 | 4969 |

FIG.9B

| reg[1:0] 2bit | bit[1] | 0:+1 |
| --- | --- | --- |
| | | 1:-1 |
| | bit[0] | 0:NO, 1:YES |

FIG.9C

| reg[3:0] 4bit | bit[3:1] | 000:+1 |
| --- | --- | --- |
| | | 001:+2 |
| | | 010:+3 |
| | | 011:+4 |
| | | 100:-1 |
| | | 101:-2 |
| | | 110:-3 |
| | | 111:-4 |
| | bit[0] | 0:NO, 1:YES |

FIG.10

| REGISTER NO. | BIT LENGTH | POSITION | SETTING VALUE | |
|---|---|---|---|---|
| reg1 | 2 | 25 | 00 | |
| reg2 | 2 | 49 | 00 | |
| reg3 | 2 | 73 | 00 | |
| reg4 | 2 | 97 | 00 | NO CORRECTION |
| reg5 | 2 | 121 | 00 | |
| reg6 | 2 | 145 | 00 | |
| reg7 | 2 | 169 | 00 | |
| reg8 | 4 | 193 | 1110 | −3 |
| reg9 | 2 | 217 | 00 | |
| reg10 | 2 | 241 | 00 | |
| reg11 | 2 | 265 | 00 | |
| reg12 | 2 | 289 | 00 | NO CORRECTION |
| reg13 | 2 | 313 | 00 | |
| reg14 | 2 | 337 | 00 | |
| reg15 | 2 | 361 | 00 | |
| reg16 | 4 | 385 | 0010 | +3 |
| reg17 | 2 | 409 | 00 | |
| reg18 | 2 | 433 | 11 | |
| reg19 | 2 | 457 | 00 | |
| reg20 | 2 | 481 | 11 | CORRECT INCLINATION |
| reg21 | 2 | 505 | 00 | |
| reg22 | 2 | 529 | 11 | |
| reg23 | 2 | 553 | 00 | |
| ⋮ | | | | |
| reg207 | 2 | 4969 | 00 | |

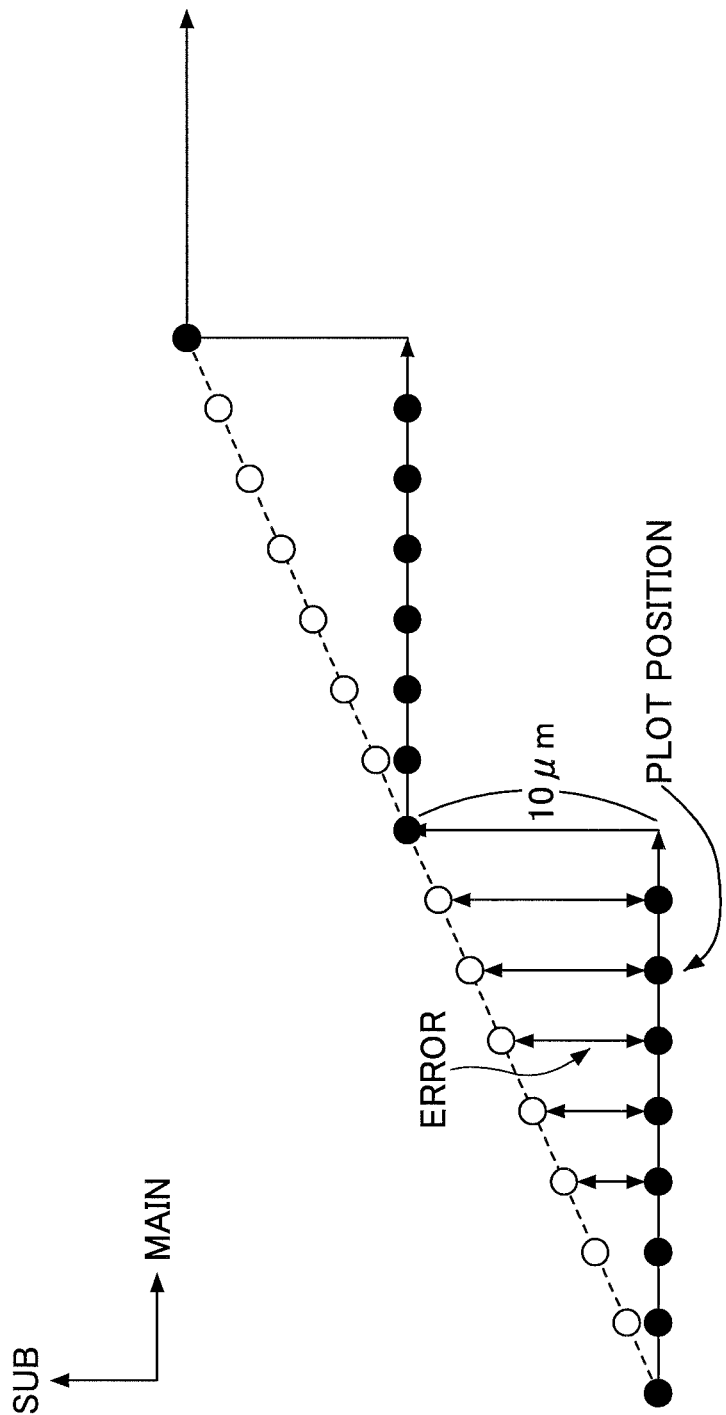

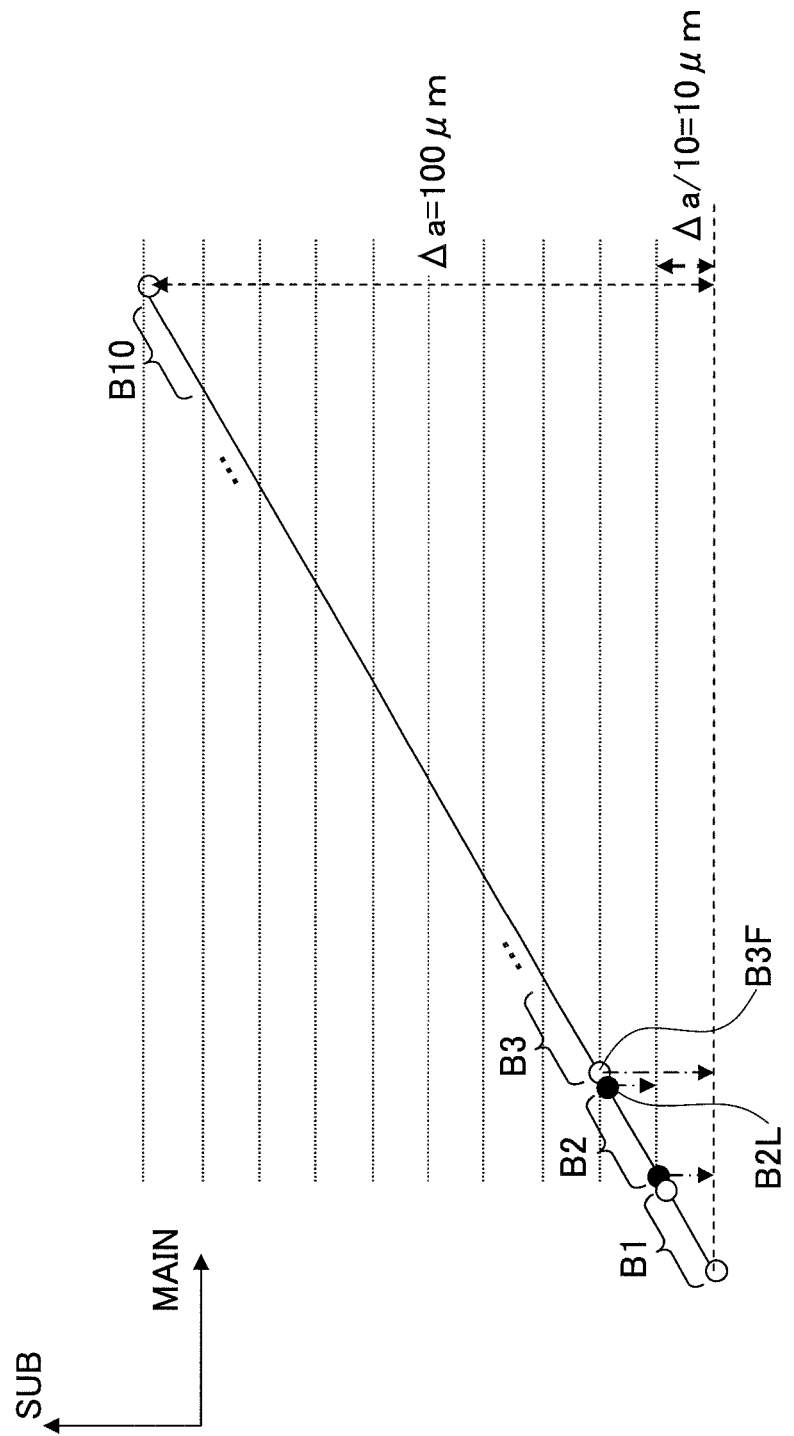

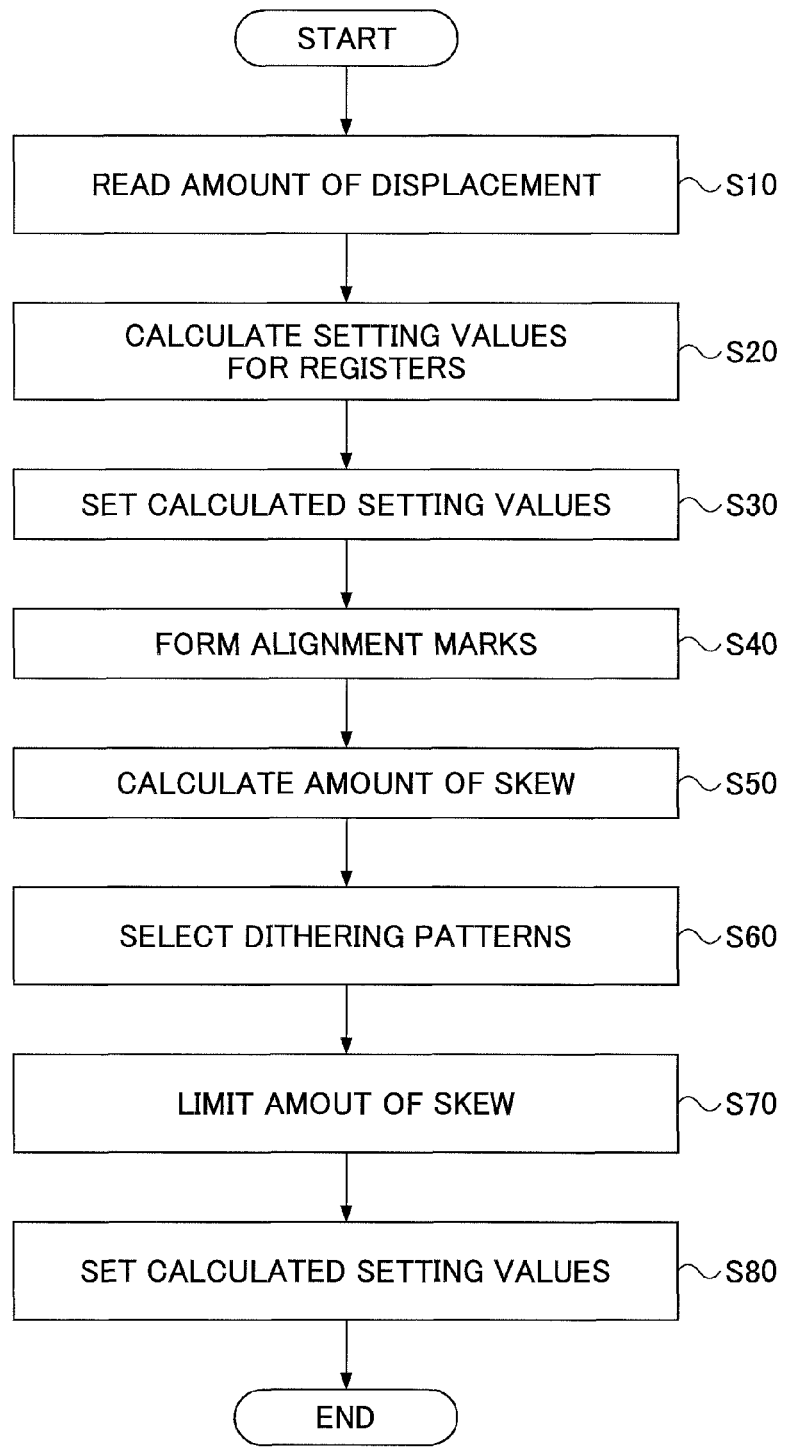

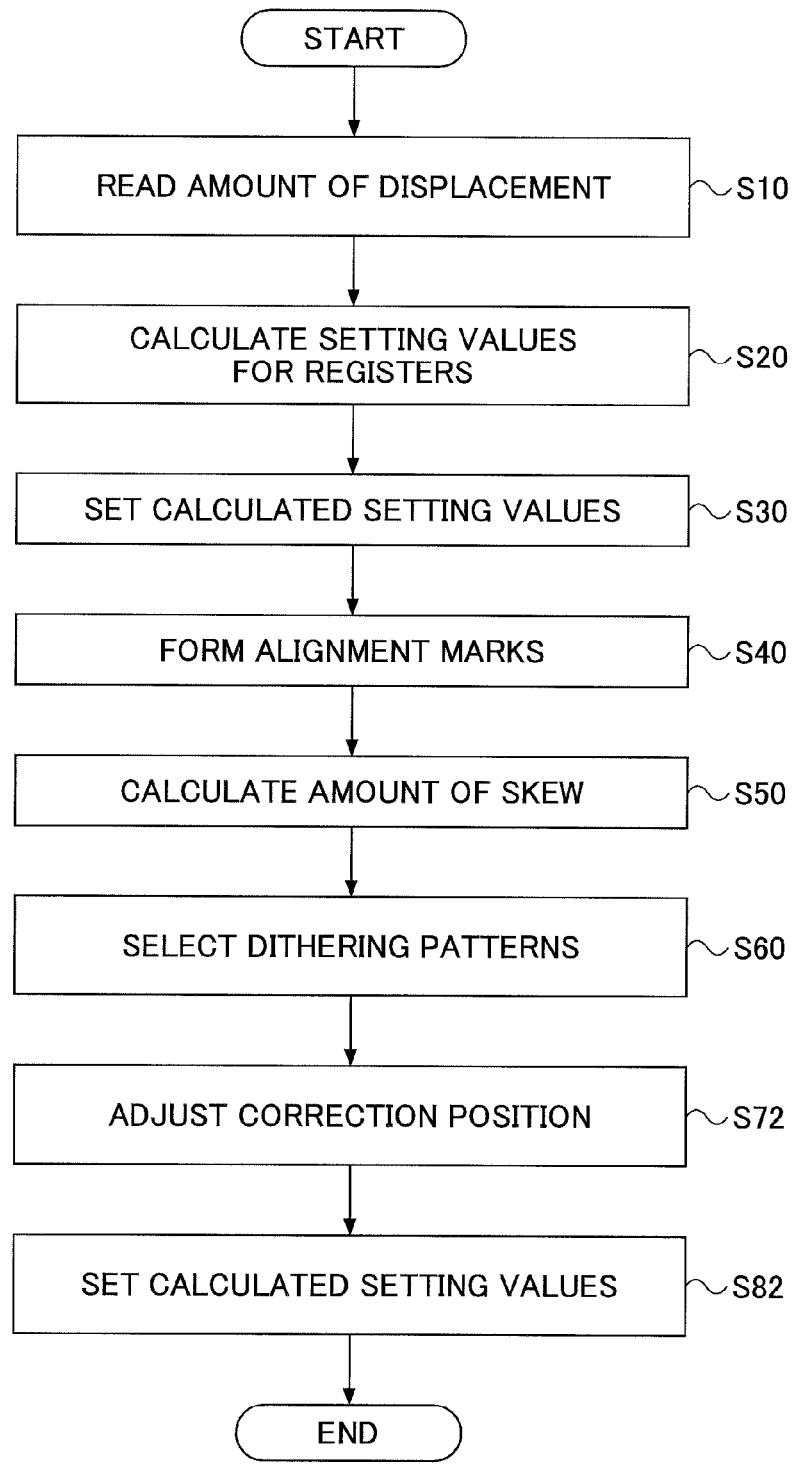

FIG.16

| Pattern | Screen angle | Maximum value($\mu$m) |
|---|---|---|
| 1 | 15° | 60 |
| 2 | 30° | 50 |
| 3 | 45° | 40 |
| 4 | 60° | 30 |

~34

METHOD OF COMPENSATING FOR ERRORS CAUSED BY A PRINT HEAD USING SKEW CORRECTION

BACKGROUND OF THE INVENTION

1. Field of the Invention

The present invention relates to an image forming apparatus and a method of adjusting an image and more specifically, to an image forming apparatus and a method of adjusting an image capable of adjusting error caused by a print head.

2. Description of the Related Art

Within an electro-photographic image forming apparatus, a latent image which has an equivalent shape as an original image is formed by irradiating light on a photosensitive body such as a photosensitive drum which is formed in a drum shape, for example. First, the image forming apparatus charges a surface of the photosensitive drum by a charging device, and then irradiates light, which is controlled based on image data, onto the charged photosensitive drum to form an electrostatic latent image on the surface. Subsequently, the image forming apparatus applied toner to the electrostatic latent image formed on the photosensitive drum with a development unit to form a visible toner image. Thereafter, the toner image is transferred to a transfer unit in accordance with a rotation of the photosensitive drum to be electrostatically transferred onto a recording paper or on a middle transfer body. The toner image transferred on the recording paper is fixed.

For an exposure apparatus used in such an image forming apparatus, a laser light scanning apparatus such as a Raster Output Scanner (ROS) in which laser light is scanned in a main scanning direction using a laser diode and a polygon mirror has been used.

However, recently, an exposure apparatus including a light emitting diode print head (LPH: LED Print Head) composed of plural LEDs aligned in the main scanning direction has also been adopted in order to miniaturize the size and decrease an electrical power consumption. The LPH includes an LED array in which plural LED chips composed of plural LEDs aligned in a line are further aligned in the main scanning direction. Further, the LPH generally includes a rod lens array composed of plural aligned rod lenses for focusing light emitted from the corresponding LEDs on a photosensitive body.

The image forming apparatus forms an image on the photosensitive body by controlling the LEDs of the LPH based on input image data to emit light toward the photosensitive body and controlling the rod lens array to form the image with the light on the photosensitive body. With this operation, an electrostatic latent image of a single line extending in the main scanning direction is formed on the photosensitive body. Then, the same operation for forming an image of a next single line extending in the main scanning direction on the photosensitive body is performed after the photosensitive body is rotated with respect to the LPH. By repeating this operation, an entire electrostatic latent image is formed on the photosensitive body in a sub-scanning direction.

For the image forming apparatus including such an LPH, if the irradiation light for a single line extending in the main scanning direction emitted, from the LPH is not in a parallel relationship with an axis direction of the photosensitive body, the electrostatic latent image formed on the photosensitive body includes distortion.

For example, if the irradiation light for a single line extending in the main scanning direction is inclined with respect to the axis direction of the photosensitive body, even when an image of a straight line extending in the main scanning direction is about to be formed, an electrostatic latent image actually formed on the photosensitive body becomes an inclined line with respect to the main scanning direction and the sub-scanning direction.

Further, if the LED chip of a single line extending in the main scanning direction is not aligned on a straight line with respect to the axis direction of the photosensitive body, even when an image of a straight line extending in the main scanning direction is about to be formed, an electrostatic latent image actually formed on the photosensitive body includes a distortion in the sub-scanning direction.

At such a case, when forming a monochromatic image where only a single LPH is used, the result is just an obtained image including distortion. However, when forming a color image by a color printer using a tandem engine, for example, where plural LPHs are used corresponding to plural colors, an obtained image includes distortions of plural colors such that image quality is seriously reduced.

Further, for the image forming apparatus, gradation of image data is converted to be expressed by pixels using image processing such as dithering, and generally, patterns for the image processing such as dithering patterns are designed and prepared not to reduce image quality. However, if the LED chips for a single line extending in the main scanning direction are not aligned on a straight line with respect to the axis direction of the photosensitive body, the influence of dithering is easily reflected to lower the image quality.

Patent Document 1 discloses a technique for correcting the displacement or skew of plural LED chips. In Patent Document 1, an image forming apparatus capable of performing a skew correction in which the plural LEDs aligned in the main scanning direction are divided into plural groups, and timings for lighting the LEDs are shifted for each of the groups. With this skew correction, degradation of image quality due to a skew in the sub-scanning direction or displacement in attaching the LED chips may be reduced.

However, according to the image forming apparatus disclosed in Patent Document 1, there may be error in the skew correction.

FIG. 1 is a view for explaining a method of correcting skew of an LPH and displacement of LED chips in a sub-scanning direction.

The image forming apparatus includes sensors for detecting an amount of skew caused by the LPH. The image forming apparatus, using the LPH, forms alignment marks 200 and 202 on a recording paper 210 (or on a middle transfer body) for detecting the amount of skew caused by the LPH and detects the amount of skew of the LPH in the sub-scanning direction. The amount of skew means a shift amount between timings at which the alignment marks 200 and 202 are detected by the sensors of the image forming apparatus. For the example shown in FIG. 1, the amount of skew is expressed as $\Delta a$.

However, some of the LED chips included in the LPH may also be shifted with respect to other LED chips within the LPH. Therefore, it is necessary for the image forming apparatus to correct such displacement of the LED chips as well. For the example shown in FIG. 1, the LED chip "n+2" is shifted by $\Delta b$ in the forward direction of the sub-scanning direction (shown as "SUB") with respect to other LED chips "n", "n+1" and "n+3". Thus, the image forming apparatus is necessary to correct the skew and the displacement.

However, recently, as image forming apparatuses are becoming able to form high resolution images, the amount of skew $\Delta a$ or the amount of displacement $\Delta b$ becomes very small to be smaller than the minimum shifting amount for which the image forming apparatus is capable of correcting.

Therefore, for the amount of skew Δa, plural of the LED chips divided into the same block are shifted for an amount corresponding to the minimum shifting amount in the sub-scanning direction. For the amount of displacement Δb, each of the LED chips is also shifted for the amount corresponding to the minimum shifting amount. Thus, by performing both the skew correction and the displacement correction where the amount of skew and the amount of displacement are both added, errors may be added as well. In other words, errors are larger than in the case where only skew correction or only displacement correction is performed.

If the errors are added, the image quality is drastically lowered. For example, by performing image processing such as dithering, due to the regularity of the dithering patterns, relatively large degradation of image quality may occur.

PATENT DOCUMENT

[Patent Document 1] Japanese Laid-open Patent Publication No. 2007-145001

SUMMARY OF THE INVENTION

The present invention is made in light of the above problems, and provides an image forming apparatus and a method of adjusting an image capable of reducing image quality degradation when performing a skew correction and a displacement correction.

According to an embodiment, there is provided an image forming apparatus including plural image forming units of plural colors, each of the image forming units including a print head including plural LED chips aligned in a main scanning direction, each of the LED chips including plural LEDs aligned in the main scanning direction, and a photosensitive body on which light from the print head is received; a displacement amount obtaining unit that obtains, for each of the colors, an amount of displacement of each of the LED chips of the print head in a sub-scanning direction with respect to a reference position; a mark forming unit that forms, for each of the colors, an alignment mark for detecting an amount of skew of the print head with respect to an axis direction of the corresponding photosensitive body while correcting the amount of displacement of the LED chips of the print head; a skew detection unit that detects, for each of the colors, the amount of skew of the print head; a screen angle selecting unit that selects screen angles for the plural colors respectively based on the amounts of skew of the plural image forming units detected by the skew detection unit; an image processing unit that performs image processing on input data to be expressed by pixels of the plural colors such that the pixels of each of the colors have a predetermined screen angle selected by the screen angle selecting unit; a correction amount determining unit that determines a total amount of skew correction based on the amount of skew detected by the skew detection unit, and determines the amount of skew correction in the sub-scanning direction for each of predetermined groups for shifting the pixels of the image data corresponding to the group in the sub-scanning direction, based on the total amount of skew correction, for each of the colors; and an image forming control unit that controls forming an image by the plural image forming units based on the image data processed by the image processing unit while correcting the amounts of displacement of the LED chips of the print heads and the skew of the print heads.

According to another embodiment, there is provided a method of adjusting an image formed by an image forming apparatus including plural image forming units of plural colors, each of the image forming units including a print head including plural LED chips aligned in a main scanning direction, each of the LED chips including plural LEDs aligned in the main scanning direction, and a photosensitive body on which light from the print head is received. The method includes obtaining, for each of the colors, an amount of displacement of each of the LED chips of the print head in a sub-scanning direction with respect to a reference position; forming, for each of the colors, an alignment mark for detecting an amount of skew of the print head with respect to an axis direction of the corresponding photosensitive body while correcting the amount of displacement of the LED chips of the print head; detecting, for each of the colors, the amount of skew of the print head; selecting screen angles for the plural colors respectively based on the detected amounts of skew of the plural image forming units; performing image processing on input data to be expressed by pixels of the plural colors such that the pixels of each of the colors have the selected predetermined screen angle; determining a total amount of skew correction based on the detected amount of skew; determining the amount of skew correction in the sub-scanning direction for each of predetermined groups of the pixels for shifting the pixels of the image data corresponding to each of the groups in the sub-scanning direction, based on the total amount of skew correction, for each of the colors; and controlling forming an image by the plural image forming units based on the processed image data while correcting the amounts of displacement of the LED chips of the print heads and the skew of the print heads.

BRIEF DESCRIPTION OF THE DRAWINGS

Other objects, features and advantages of the present invention will become more apparent from the following detailed description when read in conjunction with the accompanying drawings.

FIG. 2A and FIG. 2B are views for explaining a method of correcting skew of an LPH and displacement of LED chips in a sub-scanning direction by an image forming apparatus of an embodiment;

FIG. 9A is a view for explaining an example of set values;

FIG. 9B is a view showing an example for a case when 2 bits are necessary;

FIG. 9C a view showing an example for a case when 4 bits are necessary;

FIG. 10 is a view for explaining an example of setting values;

FIG. 12A and FIG. 12B are views for explaining examples of a mechanism for generation of error by the skew correction;

FIG. 13 is a flowchart showing an example of an operation of the image forming apparatus performing the displacement correction and the skew correction;

FIG. 14 is a flowchart showing another example of an operation of the image forming apparatus performing the displacement correction and the skew correction;

FIG. 16 shows an example of maximum values of correcting values for the skew correction stored in a maximum value storing unit.

DETAILED DESCRIPTION OF THE PREFERRED EMBODIMENTS

Figure 1:
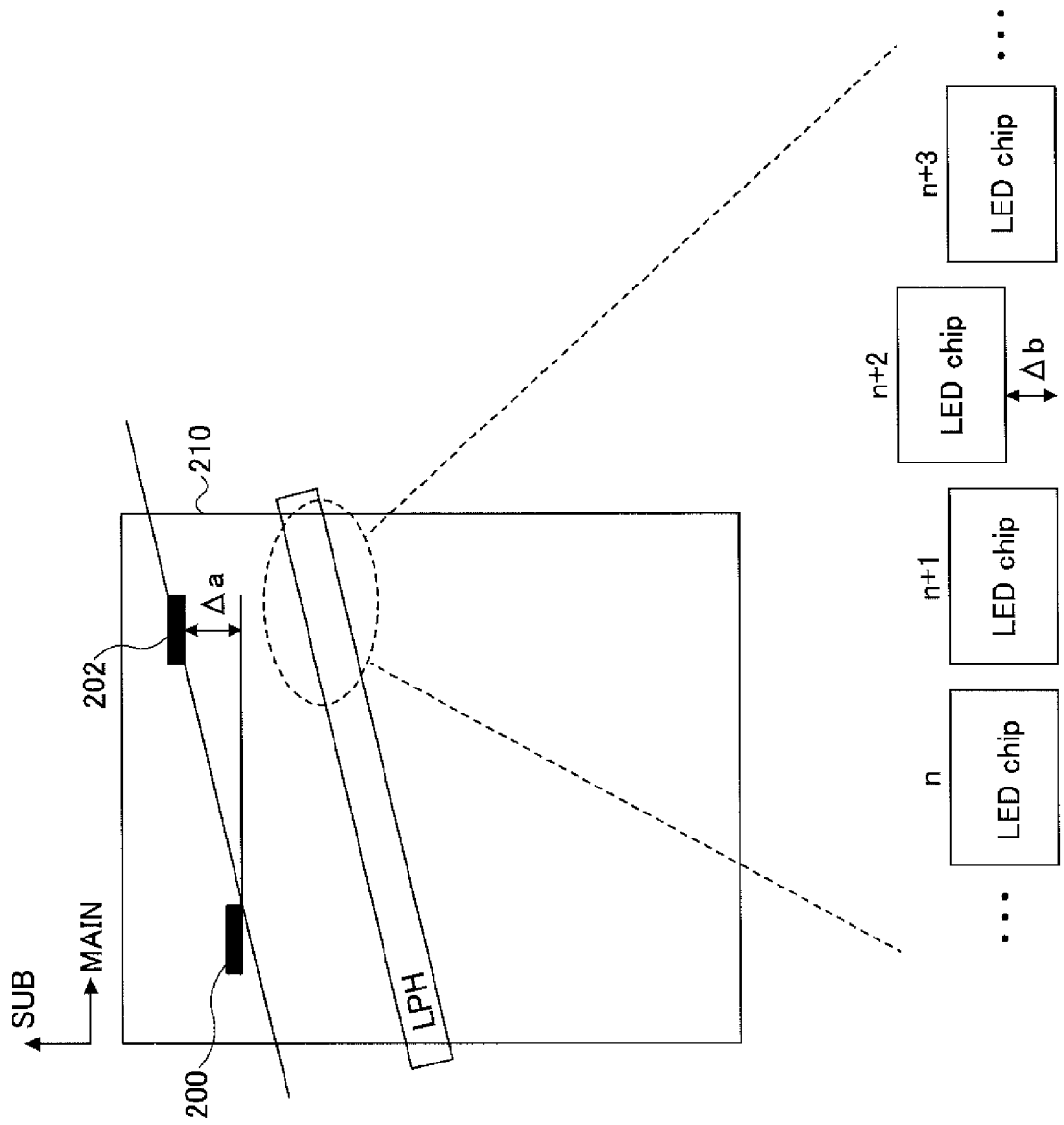
FIG. 1 is a view for explaining a method of correcting skew of an LPH and displacement of LED chips in a sub-scanning direction.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

Figure 2A:
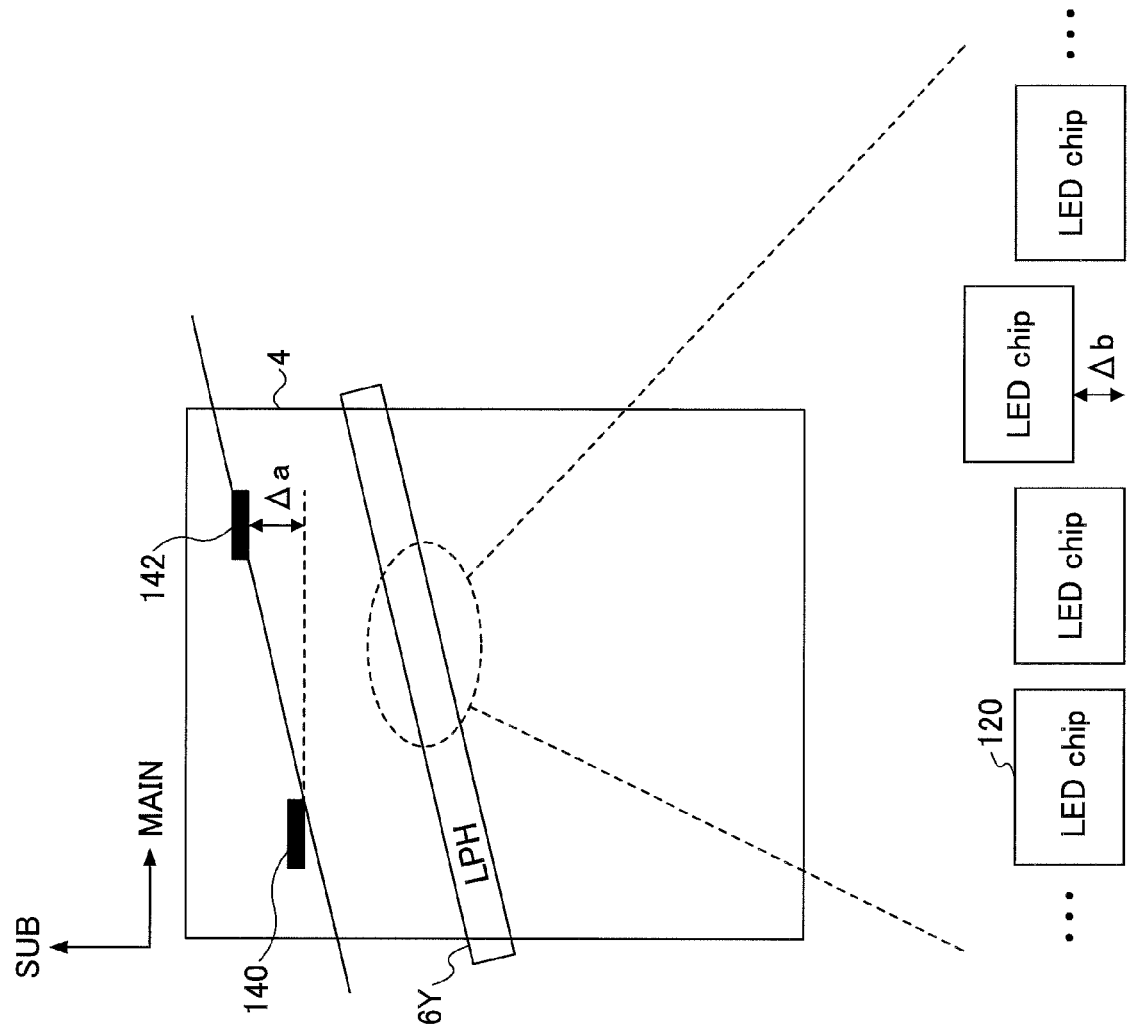

FIG. 2A and FIG. 2B are views for explaining a method of correcting skew of an LED print head (LPH) and displacement of LED chips in a sub-scanning direction by an image forming apparatus of the embodiment.

Similar to the structure explained above with reference to FIG. 1, as shown in FIG. 2A, the image forming apparatus of the embodiment includes sensors (which will be explained later) for detecting an amount of skew caused by an LED print head (LPH) 6Y, for example. The image forming apparatus, using the LPH 6Y, forms alignment marks 140 and 142 on a recording paper 4 (or on a middle transfer body) for detecting the amount of skew caused by the LPH 6Y and detects the amount of skew $\Delta a$ of the LPH 6Y in the sub-scanning direction.

According to the image forming apparatus of the embodiment, skew of the LPH 6Y in the sub-scanning direction is corrected by dividing image data of a single line, for example, in the main scanning direction into plural groups, and shifting each of the groups in the sub-scanning direction for a predetermined amount. Specifically, the skew is corrected by shifting the pixels of the image data corresponding to each of the groups in the sub-scanning direction so that the timing for emitting light for the plural LEDs corresponding to the pixels is changed. The groups may be formed to correspond to the registers, which will be explained later, and formed such that each of the groups includes the same number of LED chips.

The following operation is performed in this embodiment to maintain the image quality.

(1) First, the image forming apparatus selects a screen angle for image processing such as dithering or the like in accordance with the amount of skew of the LPH (including the LPH 6Y) for each color. It means that for the color for which the amount of skew of the LPH is larger, a dithering pattern with a smaller screen angle is selected, while for the color for which the amount of skew is smaller, a dithering pattern with a larger screen angle is selected.

For the shift in the sub-scanning direction, the smaller the screen angle of the image processing, the lower image quality degradation becomes. Therefore, for the color where the amount of skew is larger, decreasing of the image quality can be reduced by selecting the smaller screen angle for the image processing such as dithering or the like.

(2) Further, the image forming apparatus sets the maximum value for the skew correction based on the screen angle of the image processing. The image forming apparatus determines a total amount of skew correction such that it becomes equal to the amount of skew $\Delta a$ when the amount of skew $\Delta a$ is less than or equal to the predetermined set maximum value, and it becomes equal to the predetermined set maximum value when the amount of skew $\Delta a$ in FIG. 2 is greater than the predetermined set maximum value (even when $\Delta a$>maximum value, the total amount of skew correction is limited to the maximum value).

With this, even when displacement of the LED chip occurs in the group of LED chips 120 to which the skew correction is also performed, error caused by overlap of the corrections can be reduced.

(3) As for an alternative example of (2), in reference to FIG. 2B, when a change point (first change point) for shifting the LED chips 120 of the LPH 6Y in the sub-scanning direction for the skew correction overlaps a change point (second change point) for shifting the LED chips 120 in the sub-scanning direction for the displacement correction, the image forming apparatus shifts the change point for shifting the pixels in the sub-scanning direction for the skew correction. Specifically, as will be explained later, the LED chips 120 of the LPH 6Y are divided into plural groups corresponding to registers in the main scanning direction and the amounts of skew correction or the amounts of displacement correction are determined for each of the groups. Therefore, the change point for the skew correction and the change point for the displacement correction become boundaries between adjacent groups, respectively. When the change point for the skew correction and the change point for the displacement correction become the same position, which is a boundary between the adjacent groups, the image forming apparatus shifts the change point for the skew correction to another boundary between the adjacent groups which is in the vicinity of the previous boundary in the main scanning direction.

For the example shown in FIG. 2B, the LED chip 120' is to be shifted $\Delta a/n$ with respect to other adjacent LED chips 120 for the skew correction. Further, the LED chip 120' is to be shifted $\Delta b$ with respect to other adjacent LED chips 120 for the displacement correction. In this case, the LED chip 120' is to be shifted ($\Delta a/n + \Delta b$) with respect to the other adjacent LED chips 120. In such a case, the shift amount of the LED chip 120' with respect to other adjacent LED chips 120 for the corrections becomes so large that error may be increased. Thus, in this embodiment, the image forming apparatus determines the amount of skew correction such that the skew correction is performed from the adjacent LED chip 120 at the right side of the LED chip 120', for example. Therefore, the LED chip 120' is shifted $\Delta b$ in the sub-scanning direction and the LED chips 120, adjacent to the LED chip 120', are shifted ($\Delta a/n$) in the sub-scanning direction.

With this, the change points for the skew correction and the displacement correction do not overlap with each other, so that error caused by overlap of the corrections can be prevented.

(Structure)

Figure 3A:
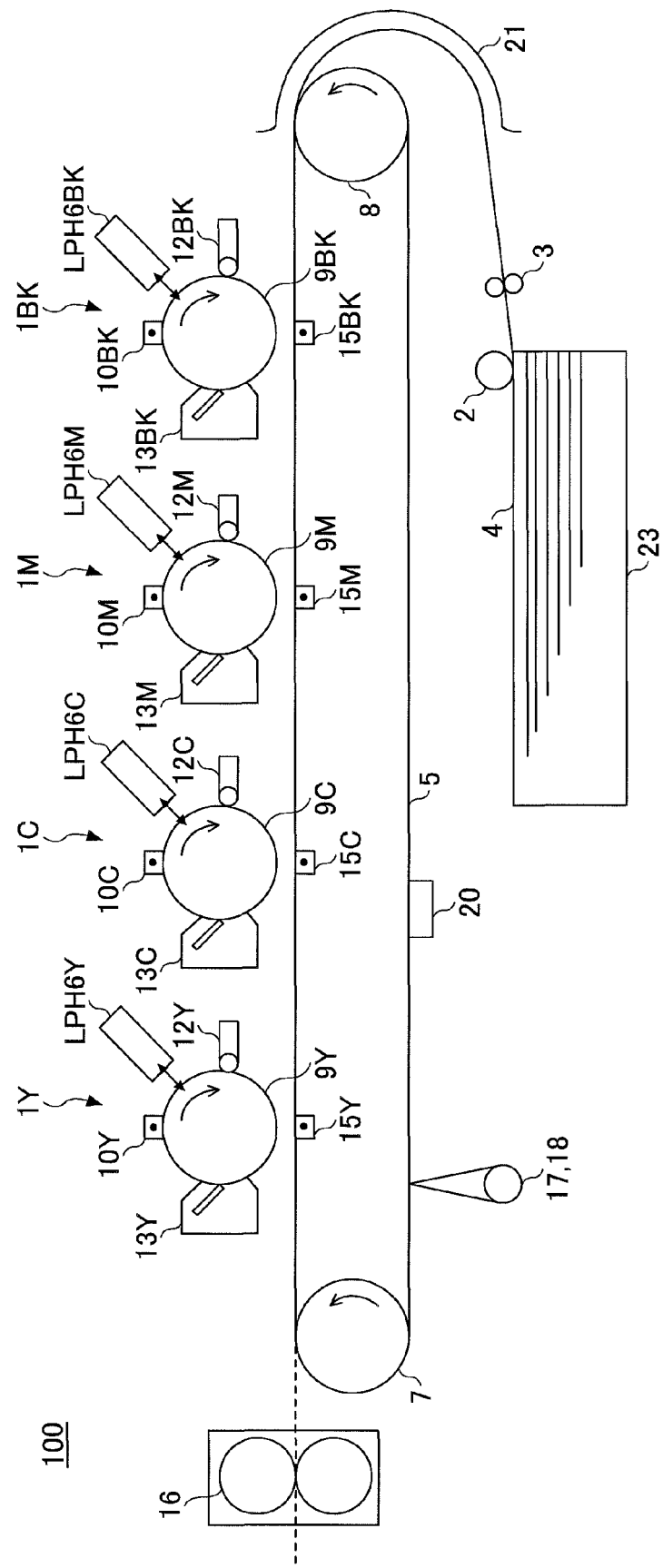
FIG. 3A shows an example of a structure of the image forming apparatus.

FIG. 3A shows an example of a structure of an image forming apparatus 100 of the embodiment.

The image forming apparatus 100 may be a tandem type electro-photographic image forming apparatus. The image forming apparatus 100 includes a paper-feed tray 23, a separating roller 2, a paper-feed roller 3, a conveying guide 21, a transfer belt 5, image forming units 1BK, 1M, 1C and 1Y, a driving roller 7, a driven roller 8, a fixing unit 16, a first sensor 17, a second sensor 18, and a cleaner 20.

The image forming units 1BK, 1M, 1C and 1Y (electro-photographic image forming units) are aligned in a conveying direction of the transfer belt 5 from upstream in this order. The recording papers 4 are stacked in the paper-feed tray 23. The recording papers 4 are separated by the separating roller 2 and conveyed one-by-one by the paper-feed roller 3 along the conveying guide 21 to the transfer belt 5.

These image forming units 1BK, 1M, 1C and 1Y have the same structure although the colors of toner are different. The image forming unit 1BK forms an image of black, the image forming unit 1M forms an image of magenta, the image forming unit 10 forms an image of cyan, and the image forming unit 1Y forms an image of yellow. Although the structure of the image forming unit 1BK is explained in detail in the following, the structures of the image forming units 1M, 1C and 1Y are the same as the image forming unit 1BK and the explanation is not repeated.

The transfer belt 5 is an endless belt and is supported by the driving roller 7 and the driven roller 8. The driving roller 7 is driven by a driving motor (not shown in the drawings). The driving motor, the driving roller 7, and the driven roller 8 function as a driving unit to move the transfer belt 5.

When forming an image, the recording paper 4 stacked in the paper-feed tray 23 is sent from the upper side of the paper-feed tray 23 and adhered to the transfer belt 5 by electrostatic force to be transferred by the transfer belt 5 to a position below the first image forming unit 1BK.

The image forming unit 1BK includes a photosensitive drum 9BK (photosensitive body), a charging unit 10BK, an LPH 6BK, a development unit 12BK, a photosensitive body cleaner (not shown in the drawings), a static eliminator 13BK, a transfer unit 15BK and the like, which are positioned around the photosensitive drum 9BK. The LPH 6BK is formed to expose the photosensitive drum 9BK with light.

Similarly, the image forming units 1M, 1C and 1Y include photosensitive drums 9M, 9C and 9Y (photosensitive body), and charging units 10M, 10C and 10Y, LPH 6M, 6C and 6Y, development units 12M, 12C and 12Y, photosensitive body cleaners (not shown in the drawings), static eliminators 13M, 13C and 13Y, transfer units 15M, 15C and 15Y and the like, which are positioned around the photosensitive drums 9M, 9C and 9Y, respectively.

When forming an image, the charging unit 10BK charges an outer surface of the photosensitive drum 9BK in the dark, and then the LPH 6BK irradiates light corresponding to an image of black to form an electrostatic latent image. The development unit 12BK visualizes the electrostatic latent image by applying black toner to form a toner image of black onto the photosensitive drum 9BK. The toner image of black is transferred on the recording paper 4 at a position (transferring position) where the photosensitive drum 9BK and the recording paper 4 on the transfer belt 5 make contact. This means that the transfer unit 15BK moves toward the photosensitive drum 9BK to have the recording paper 4 contact the photosensitive drum 9BK while applying an electrostatic charge so that the toner image of black is transferred onto the recording paper 4.

After transferring the toner image of black onto the recording paper 4, the photosensitive drum 9BK is cleaned by the photosensitive cleaner (not shown in the drawings) and discharged by the static eliminator 13BK to be prepared for a next image.

With the above operation, the recording paper 4 onto which the toner image of black is transferred by the image forming unit 1BK is further conveyed to a position below the next image forming unit 1M by the transfer belt 5. The image forming unit 1M performs the same operation as the image forming unit 1BK and transfers a toner image of magenta onto the recording paper 4 such that it superposes the toner image of black. Similarly, the recording paper 4 is further transferred to positions corresponding to the image forming units 1C and 1Y and a toner image of cyan and a toner image of yellow are superposed on the toner image of black and the toner image of magenta on the recording paper 4.

With this, a full-color image is formed on the recording paper 4. The recording paper 4 on which the full-color image is formed is separated from the transfer belt 5 and conveyed to the fixing unit 16. The fixing unit 16 fixes the toner image on the recording paper 4. Then the recording paper 4 is ejected outside of the image forming apparatus 100.

The first sensor 17 and the second sensor 18 are positioned to face the transfer belt 5. Specifically, the first sensor 17 and the second sensor 18 have similar structures and are positioned in a width direction of the transfer belt 5 at an interval. The structure of the first sensor 17 and the second sensor 18 will be explained later in detail.

Figure 4:
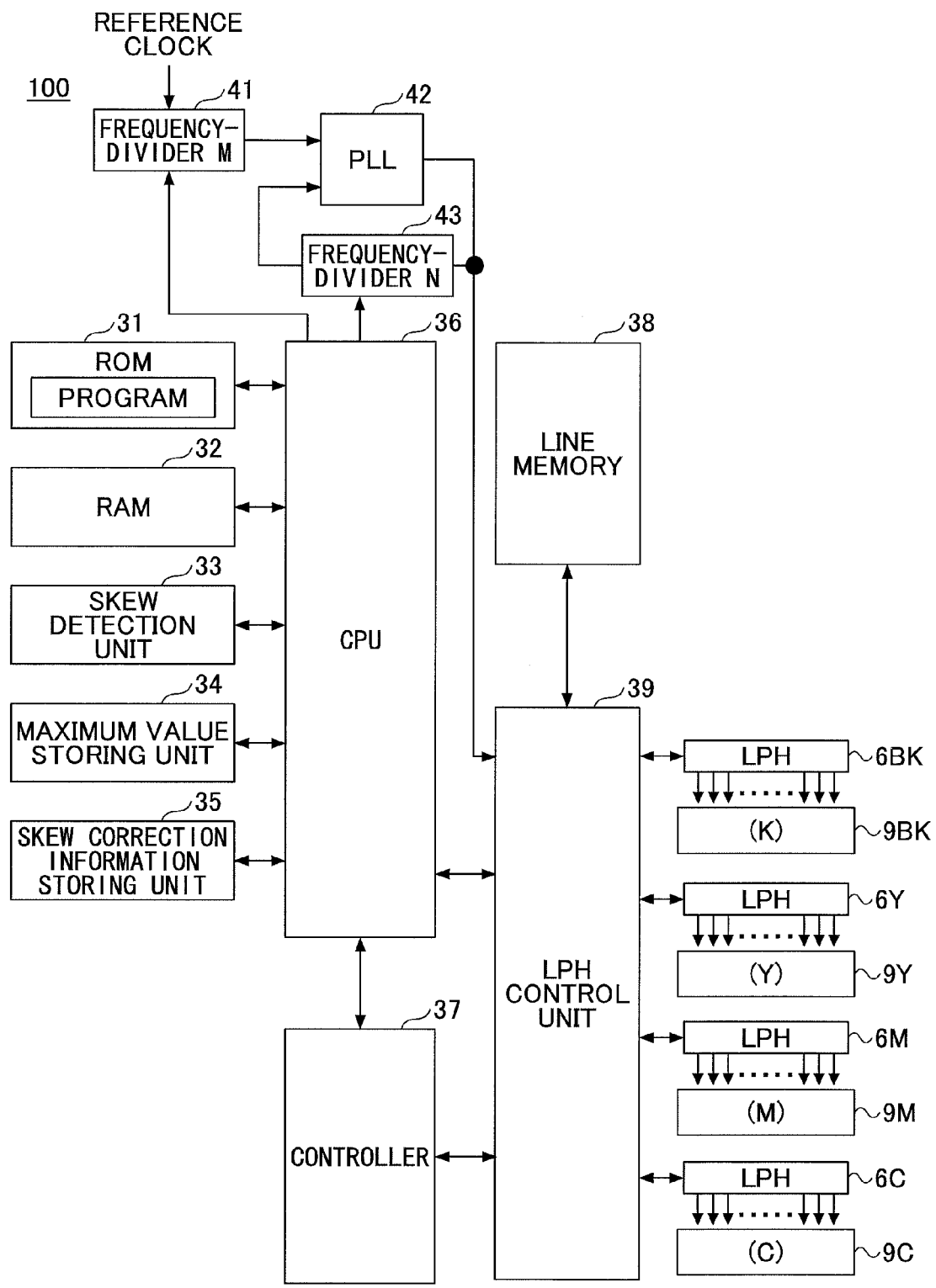
FIG. 4 is a block diagram showing an example of functions of the image forming apparatus.

FIG. 4 is a block diagram showing an example of functions of the image forming apparatus 100.

The image forming apparatus 100 includes a ROM 31, a RAM 32, a skew detection unit 33, a maximum value storing unit 34, a skew correction information storing unit 35, a controller 37, a CPU 36, a line memory 38, an LPH control unit 39, a frequency-divider M 41, a phase-locked loop (PLL) 42, and a frequency-divider N 43.

The controller 37 controls the entirety of the image forming apparatus 100. The CPU 36 and the LPH control unit 39 are connected to the controller 37. The controller 37 performs various image formations such as controlling a series of processes for forming an image on the recording paper 4 or the like based on image data stored in the line memory 38.

The ROM 31, the RAM 32, the skew detection unit 33, the maximum value storing unit 34, the skew correction information storing unit 35, the controller 37, and the like are connected to the CPU 36. The ROM 31 stores a program or static data. The RAM 32 is a working memory where a program and data are temporarily stored when the CPU 36 executes the program. The structures and functions of the skew detection unit 33, the maximum value storing unit 34, and the skew correction information storing unit 35 will be explained later in detail. The image forming apparatus 100 may further include a HDD, a Network Interface Card (NIC) or the like, although not shown in the drawings.

The CPU 36 sets division rates in the frequency-divider M 41 and the frequency-divider N 43. The frequency-divider M 41 divides a reference clock based on the set division rate to output to the PLL 42. The frequency-divider N 43 divides a clock signal output by the PLL 42 based on the set division rate to feed back to the PLL 42. With this, the PLL 42 outputs a clock signal to the frequency-divider N 43 such that the frequency of the clock signal output by the frequency-divider N 43 becomes the same as the frequency of the clock signal output by the frequency-divider M 41. Thus, the CPU 36 can control the frequency of the clock signal output to the LPH control unit 39 by the frequencies set to the frequency-divider M 41 and the frequency-divider N 43. Here, a cycle of the clock signal corresponds to a pixel of an image.

The line memory 38 stores image data of a document sent from a personal computer (PC) connected to the image forming apparatus 100 via a network or image data of a document scanned by a scanner of the image forming apparatus 100.

As will be explained later, image processing such as dithering or the like is performed on input image data to form raster data to be stored in the line memory 38. The line memory 38 is configured to store at least one to a few lines in the main scanning direction of image data. When the image data is of a color image, the image data includes pixel values of C, M, Y and BK for each of the pixels. The LPH control unit 39 reads the image data stored in the line memory 38 for each of the lines in the main scanning direction and divides the data for BK, Y, M and C.

The LPH 6BK that emits light onto the photosensitive drum 9BK, the LPH 6Y that emits light onto the photosensitive drum 9Y, the LPH 6M that emits light onto the photosensitive drum 9M, and the LPH 6C that emits light onto the photosensitive drum 9C are connected to the LPH control unit 39. The LPHs 6BK to 6C are LED arrays and respectively composed of plural LED chips, in each of which plural LEDs are aligned in a line form in the main scanning direction. The number of LED chips for each of the LPHs 6BK to 6C may be, for example, a few dozens (in the following example, it is 26), and the number of LEDs for each of the LED chips may be, for example, a few hundreds (in the following example, it is 192). These numbers may be appropriately set in accordance with the case.

The LPH control unit 39 controls the LPHs 6BK to 6C based on the image data for the lines of the respective colors so that the driven one of the LPHs 6BK to 6C emits light (infrared light). With this, the light exposes the corresponding photosensitive drums 9BK, 9Y, 9M and 9C.

(Functional Block)

Figure 8:
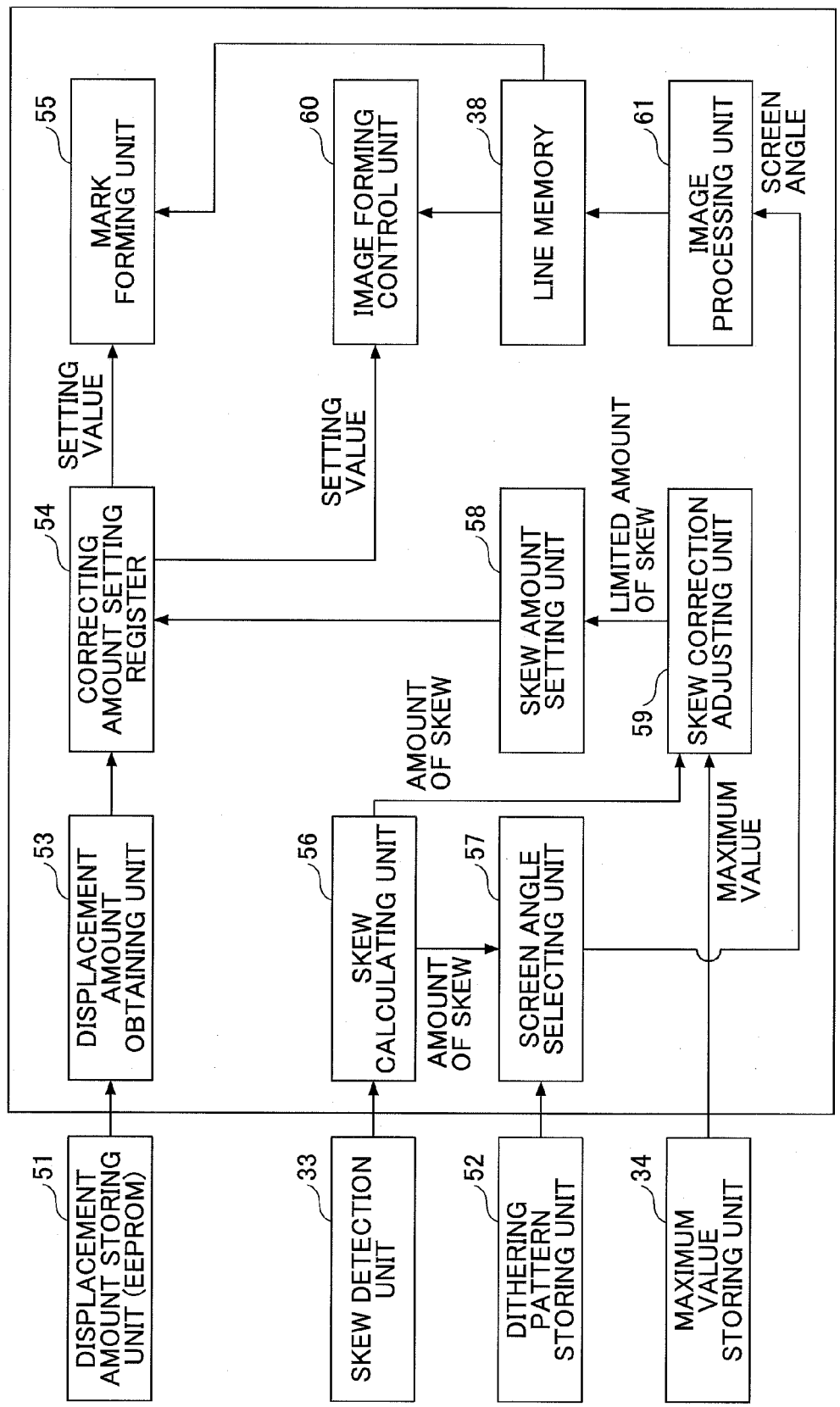
FIG. 8 is a functional block diagram of an example of the image forming apparatus.

FIG. 8 is a functional block diagram of an example of the image forming apparatus 100.

The image forming apparatus 100 includes a displacement amount storing unit 51, a displacement amount obtaining unit 53, the skew detection unit 33, the maximum value storing unit 34, a skew calculating unit 56, a dithering pattern storing unit 52, a screen angle selecting unit 57, an image processing unit 61, a correcting amount setting register 54, a mark forming unit 55, an image forming control unit 60, a skew amount setting unit 58 (correction amount determining unit), the line memory 38, and a skew correction adjusting unit 59 (correction amount determining unit).

These functions are actualized by cooperative operations by the CPU 36 executing software such as the program stored in the ROM 31 (or in the HDD, not shown in the drawings) and hardware such as an ASIC and the sensors (17, 18 or the like).

(Image Processing Such as Dithering)

As described above, the image data stored in the line memory 38 is the raster data (bit map data). The raster data is formed by the image processing unit 61 composed of an ASIC or the like. For example, when the image data is of a document, the image processing unit 61 interprets a printing command to categorize the document into text, an image, a graphic, or the like and uses an appropriate dithering pattern (mainly, the number of lines or a pattern is different) corresponding to the category. Further, when the image data is of a scanned document, the image processing unit 61 performs segmentation and uses an appropriate dithering pattern based on whether the segment is a text region, an image region or the like. For example, when the segment is the image region, a dithering pattern with low screen ruling is preferred such that the gradation is in preference, while when the segment is the text region, a dithering pattern with high screen ruling is preferred such that the edge of characters is emphasized.

Figure 5:
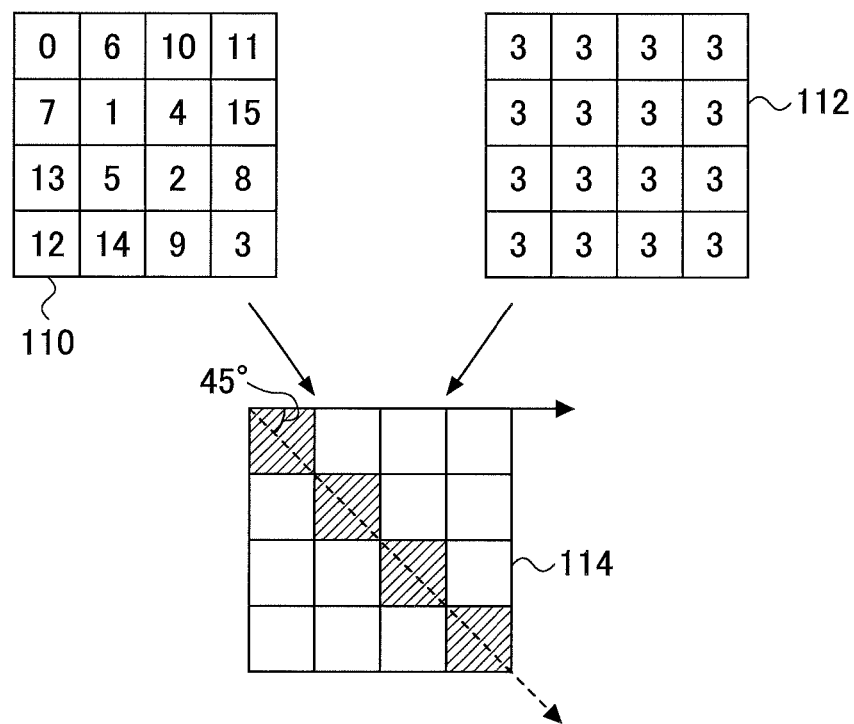
FIG. 5 is a view for explaining an example of dithering.

FIG. 5 is a view for explaining an example of dithering.

In FIG. 5, input image data 112 is processed with dithering using a dithering pattern 110 to obtain raster data 114.

In this example, the image data 112 is uniform gray level data. Although the dithering pattern 110 is expressed as 16 gray levels (from 0 to 15) in this example, the dithering pattern 110 may be expressed in accordance with the gray levels of input image data such as 256 gray levels or the like. The image processing unit 61 determines to print (plot) a pixel when its pixel value is more than the pixel value of the corresponding pixel of the dithering pattern, and if not, determines not to print the pixel. For the image data 112 shown in FIG. 5, the pixel values of all of the pixels are "3", the pixels where the pixel values of the corresponding pixels of the dithering pattern 110 is less than or equal to "3" are determined to be printed. Thus, in the raster data 114, pixels in an inclined direction are determined to be printed (plotted). By using the dithering pattern 110, in which the pixels in the inclined direction (assuming a three o'clock direction as a reference direction, rotated 45° in a clockwise direction from the three o'clock direction) are tend to be printed, the raster data of input image data may be similar to that of the raster data 114 even if the input image data is not the uniform gray level data. The reference direction (in this case, three o'clock direction) may be set equal to the main scanning direction. Thereinafter, the angle of the dithering pattern and the reference direction in the clockwise direction is referred to as a screen angle.

Generally, when the image processing unit 61 performs image processing such as dithering or the like, dithering patterns with different screen angles are used for each of the colors in order to reduce moire effect. Therefore, the image processing unit 61 uses dithering patterns with various screen angles such as 15°, 30°, 45°, 60° or the like.

Further, influence of skew correction on the image differs based on the screen angle of the dithering pattern. It is known that the smaller the screen angle of the dithering pattern, the smaller the influence of the skew correction on the image becomes, while the larger the screen angle of the dithering pattern, the larger the influence of the skew correction on the image becomes. Therefore, in accordance with this fact, the image quality may be improved by using the dithering pattern with smaller screen angle for the color for which the amount of skew is detected to be larger.

For example, if the amount of skew of the LPH 6Y for yellow> the amount of skew of the LPH 6M for magenta> the amount of skew of the LPH 6BK for black> the amount of skew of the LPH 6C for cyan, the image processing unit 110 uses a dithering pattern with 15° for yellow image data, a dithering pattern with 30° for magenta image data, a dithering pattern with 45° for black image data, and a dithering pattern with 60° for cyan image data. With this, even when the skew correction is performed, the image quality can be maintained.

Similar to dithering, image processing such as a density pattern method or random dithering by which the image data is expressed by dots, the same operations are performed. When the image forming apparatus 100 does not include the dithering pattern, the dithering pattern can be generated by a computation or the like.

(Displacement Correction)

The LPHs 6BK to 6Y are generally composed of plural semiconductor chips, in each of which plural LEDs are integrated, mounted on a substrate. For example, each of the LPHs 6BK to 6Y is formed by integrating 192 LEDs in the main scanning direction to form an LED chip and then assembling 26 of the LED chips in the main scanning direction on a substrate. Each of the LED chips is provided with identification (ID).

For example, the pitch between adjacent dots (LEDs) may be 42.3 μm and in this case, the resolution in the main scanning direction can be 600 dpi.

Figure 6:
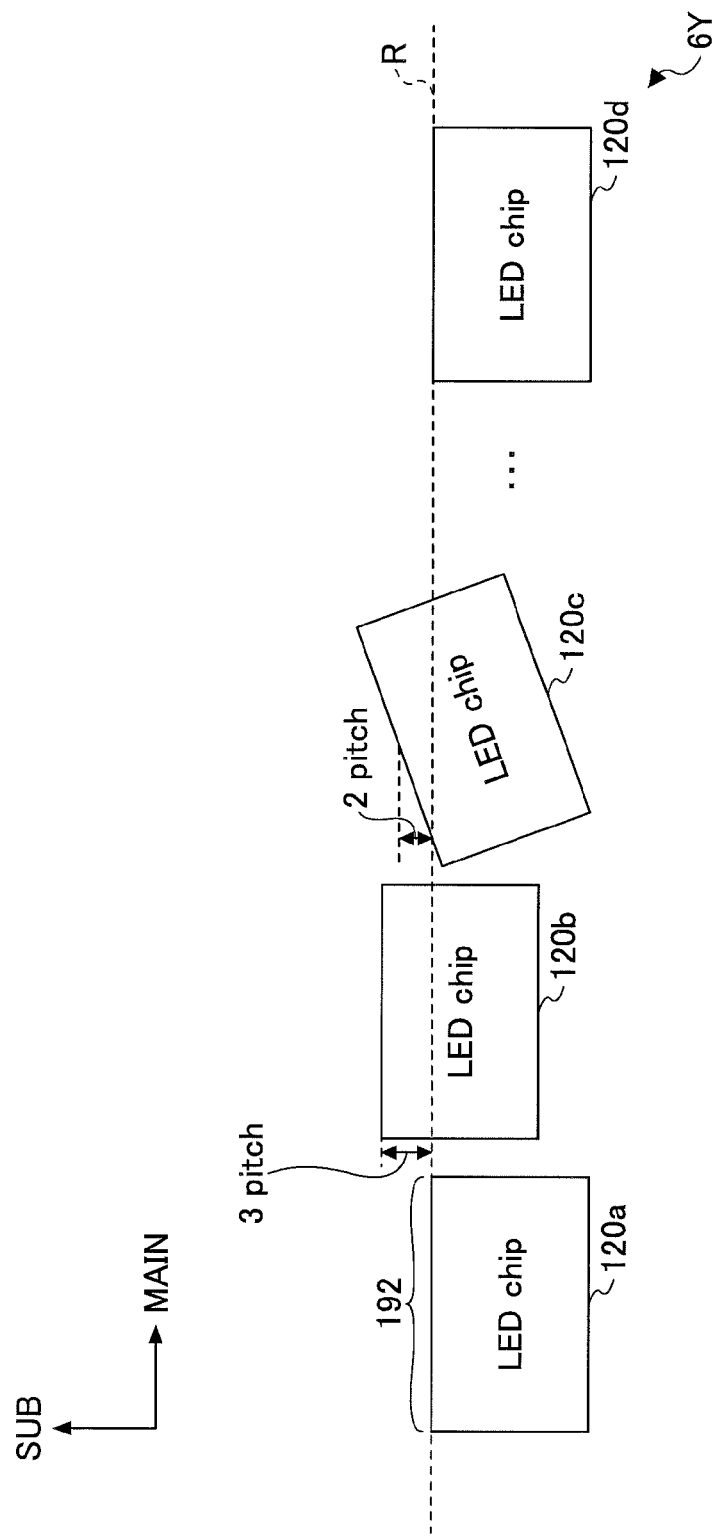
FIG. 6 is a view for explaining an example of displacement of an LED chip.

FIG. 6 is a view for explaining an example of the displacement of the LED chip.

In this example, LED chips 120a to 120d of the LPH 6Y are shown for explanation. The LED chips 120a to 120d are aligned in this order from the left side in the main scanning direction.

As shown in FIG. 6, due to a precision limitation in assembling the LED chips 120a to 120d to form the LPH 6Y, the positions of LED chips 120a to 120d may be displaced from a reference position. When the position of the LED chip 120b, for example, is shifted, light beams from the LEDs included in the LED chip 120b do not focus on the imaging surface of the photosensitive drum 9BK to thereby cause a reduction of image quality and a positional shift between colors. In order to correct such displacements, the amount of displacement of each of the LED chips 120a to 120d is measured by a manufacturer of the LPH 6Y and provided with the LPH 6Y. With this measurement, the manufacturer of the image forming apparatus 100 can perform the displacement correction.

The amounts of displacement are stored in the displacement amount storing unit 51. The displacement amount storing unit 51 may be composed by a nonvolatile memory included in the LPH 6Y such as an EEPROM or the like.

The amounts of displacement for the LED chips 120a to 120d of the LPH 6Y may be provided in a form corresponding with the identification (ID) of the corresponding LPH 6Y and the LED chips 120a to 120d and stored in a non-volatile memory or via a network. Thus, after mounting the LPH 6Y on the image forming apparatus 100, by reading the amounts of displacement from the EEPROM or the like included in the LPH 6Y, the amounts of displacement of the corresponding LED chips 120a to 120d at the time of mounting, can be obtained.

Figure 7:
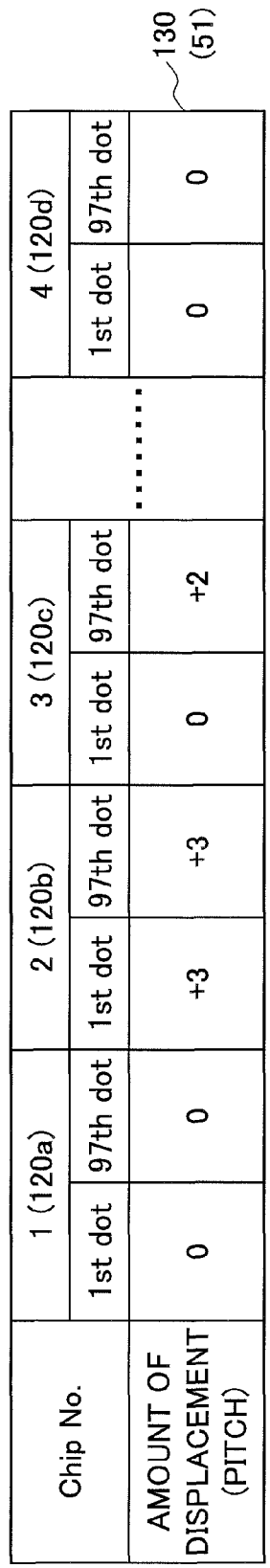
FIG. 7 is a view showing an example of a displacement table.

FIG. 7 is a view showing an example of a displacement table 130 stored in the displacement amount storing unit 51.

With reference to FIG. 6 as well, in this example, the reference position is defined by a reference line "R" connecting a 1st dot (pixel or LED) of the LED chip 120a (which is at the left end of the LPH 6Y and has a chip number "1") and a 97th dot of the LED chip 120d (which is at the right end of the LPH 6Y and has a chip number "26").

The amount of displacement of each of the LED chips 120a to 120d is expressed by a pitch of dots from the reference line "R" in the sub-scanning direction. In this example, the upward direction in FIG. 6 is assumed as a forward direction and the downward direction in FIG. 6 is assumed as a backward direction. Here, the pitch may be 10.6 μm of 2400 dpi.

For example, as for the LED chip 120b having a chip number "2", both the 1st dot and the 97th dot are displaced three pitches from the reference line "R" in the forward direction of the sub-scanning direction. This means that the LED chip 120b is totally displaced from the reference line "R" three pitches in the forward direction of the sub-scanning direction.

As for the LED chip 120c having a chip number "3", the 1st dot is not displaced from the reference line "R", but the 97th dot is displaced two pitches from the reference line "R" in the forward direction of the sub-scanning direction. This means that the LED chip 120c is inclined with respect to the reference line "R".

In this embodiment, in order to correct the amounts of displacement, the LPH control unit 39 includes the correcting amount setting register 54. When the LPH control unit 39 performs the displacement correction for each set of 24 dots of each of the LED chips in the main scanning direction, the correcting amounts (1 to few pitches or lines in the forward direction or the backward direction of the sub-scanning direction) for each set of 24 dots as one group are set in the correcting amount setting register 54.

Here, it is assumed that the number of LED chips 120a to 120d included in the LPH 6Y is 26, and the number of LED (dots) for each of the LED chips 120a to 120d is 192. The number of dots for each of the groups may be a divisor of the number of LEDs (dots) for each of the LED chips. In this case, the total dot number in the main scanning direction becomes 192×26=4992. When every 24 dots are grouped as one group, the number of necessary registers becomes 4992÷24=208.

Further, by assuming one of the 208 groups (for example, at the left end when facing the photosensitive drum 9Y) as a reference, it is not necessary to perform the displacement correction for this group and therefore the number of necessary registers becomes 207.

FIG. 9A is a view for explaining an example of set values set in the correcting amount setting register 54.

As shown in FIG. 9A, the "reference dot position" (just shown as "position") and the "bit length" are previously set for each of the registers reg1 to reg207. The "reference dot position" shows a position of the displacement table 130 shown in FIG. 7 for calculating the correcting amount to be set in the registers reg1 to reg207. The displacement amount obtaining unit 53 refers to the displacement table 130 shown in FIG. 7 based on the "reference dot position". When one group is composed of 24 dots, the "reference dot position" of the amount of displacement set to be the register reg1 is the 25th dot in the displacement table 130 shown in FIG. 7.

The "bit length" expresses a necessary memory capacity for each of the groups of the correcting amount setting register 54. The "bit length" is determined based on the amount of correction so that it is set as a variable value. When it is necessary to shift the dots of the corresponding group for one line (one pitch), 2 bits are necessary for defining whether to correct and the direction (forward or backward). When it is necessary to shift the dots of the corresponding group for more than 1 (four lines or four pitches, for example) 4 bits are necessary for defining whether to correct the direction, and two for the amount of displacement.

FIG. 9B shows an example for the case when 2 bits are necessary. When 2 bits are used, bit[0] (the most significant bit (MSB)) expresses whether to correct and bit[1] (the least significant bit (LSB)) expresses the amount and the direction of the correction.

The values for the bit[0] are defined as; "0" means it is not necessary to correct (NO) and "1" means it is necessary to correct (1). The values for the bit[1] are defined as; "0" means 1 line in the forward direction (+1) and "1" means 1 line in the backward direction (−1).

FIG. 9C shows an example for the case when 4 bits are necessary. When 4 bits are used, bit[0] (MSB) expresses whether to correct and other lower bits (bit[3:1]) express the amount and the direction of the correction.

The values for the bit[0] are defined as the same as that of the case when 2 bits are used as explained above. The values for the bits[3:1] are defined as follows.

000: 1 line in the forward direction (+1)
001: 2 lines in the forward direction (+2)
010: 3 lines in the forward direction (+3)
011: 4 lines in the forward direction (+4)
100: 1 line in the backward direction (−1)
101: 2 lines in the backward direction (−2)
110: 3 lines in the backward direction (−3)
111: 4 lines in the backward direction (−4)

The displacement amount obtaining unit 53 refers to the displacement table 130 stored in the displacement amount storing unit 51 and reads the amounts of displacement at the corresponding "reference dot positions" shown in FIG. 9A in order.

FIG. 10 is a view for explaining an example of setting values set in the correcting amount setting register 54.

According to the displacement table 130 shown in FIG. 7, the amount of displacement for the 25th dot, which is included in the LED chip 120a, is set as "0" (which is equal to the 1st dot of the LED chip 120a). Therefore, the displacement amount obtaining unit 53 sets "00", indicating correction is unnecessary, for the setting value of the "reg1" in the correcting amount setting register 54.

Similarly, according to the displacement table 130 shown in FIG. 7, the amounts of displacement for the 26th to 192nd dots, which are included in the LED chips 120a, are set as "0". Therefore, the displacement amount obtaining unit 53 sets "00" for the setting value of the "reg2" to "reg7" in the correcting amount setting register 54.

Further, according to the displacement table 130 shown in FIG. 7, the amount of displacement for the 193rd dot, which is the 1st dot of the LED chip 120b, is set as "+3". This means that the position of the 1st dot of the LED chip 120b should be corrected 3 lines in the backward direction of the sub-scanning direction. Therefore, the necessary bit length becomes four and the displacement amount obtaining unit 53 sets "1110" ("1"+"110"), indicating 3 lines in the backward direction, for the setting value of the "reg8" in the correcting amount setting register 54.

Further, according to the displacement table 130 shown in FIG. 7, the amounts of displacement for the 193rd to 384th dots, which are included in the LED chip 120b, are constant at "+3". However, in this embodiment, the setting value of the correcting amount setting register 54 is set with respect to the setting value of the proximate group. Therefore, when the amount of displacement is the same as that of the proximate group, it is unnecessary to perform a further correction. Thus, the displacement amount obtaining unit 53 sets "00" for the setting value of the "reg9" to "reg15" in the correcting amount setting register 54.

Further, according to the displacement table 130 shown in FIG. 7, the amount of displacement for the 385th dot, which is the 1st dot of the LED chip 120c, is set as "0". This means that the setting value for this dot with respect to the setting value of the proximate group becomes 3 lines in the forward direction of the sub-scanning direction. Therefore, the displacement amount obtaining unit 53 sets "0010", indicating 3 lines in the forward direction, for the setting value of the "reg16" in the correcting amount setting register 54.

Further, for the LED chip 120c, which is positioned to be inclined with respect to the reference line "R" as shown in FIG. 6, the displacement amount obtaining unit 53 calculates the setting values of the groups while taking the inclination into consideration. Specifically, the displacement amount obtaining unit 53 calculates the inclination of the LED chip 120c based on the amounts of displacement of the 1st dot and the 97th dot. For the LED chip 120c, as there are "2-0" pitches difference among 97 dots, there is about 1 dot difference among 48 dots. Thus, the displacement of the LED chip 120c is corrected for 1 line (1 pitch) for every 48 dots in the backward direction of the sub-scanning direction.

Therefore, the displacement amount obtaining unit 53 sets "11", indicating 1 line in the backward direction, for the setting value of the "reg18" corresponding to the dot position 433 (=385 dot+48 dots) in the correcting amount setting register 54.

The reference dot position for the next "reg19" is 457. It is only 24 dots from the reference dot position 433 of the "reg18" and the amount of correction is less than one pitch. Thus, the displacement amount obtaining unit 53 sets "00", indicating correction is unnecessary, for the setting value of the "reg19" in the correcting amount setting register 54.

The reference dot position for the next "reg20" is 481. It is 48 dots from the reference dot position 433 of the "reg18" and the amount of correction is equal to one pitch. Thus, the displacement amount obtaining unit 53 sets "11" for the setting value of the "reg20" in the correcting amount setting register 54.

Similarly, the reference dot position for the next "reg21" is 505. It is only 24 dots from the reference dot position 481 of the "reg202" and the amount of correction is less than one pitch. Thus, the displacement amount obtaining unit 53 sets "00" for the setting value of the "reg21" in the correcting amount setting register 54.

Similarly, the reference dot position for the next "reg22" is 529. Here, it is 48 dots from the reference dot position 481 for "reg20" and the amount of correction is equal to one pitch. Thus, the displacement amount obtaining unit 53 sets "11" for "reg22" in the correcting amount setting register 54.

The displacement amount obtaining unit 53 sets correcting values in a step-wise form for the LED chips which are displaced when being mounted.

As 1 pitch is defined as the distance between dots for 2400 dpi, the resolution of input data in the sub-scanning direction may be 2400 dpi. However, even when the resolution of the input data in the sub-scanning direction is 600 dpi, the displacement amount obtaining unit 53 may correct the setting values. For example, when the image data is 600 dpi, the displacement amount obtaining unit 53 may calculate a constant value "n" as 2400/600=4 based on the resolution of the input data in the sub-scanning direction. Then, multiply the constant value "n" by the setting values to obtain the correcting values. With this, regardless of the resolution of the input image data, the displacement correction can be performed with high accuracy.

(Correction of Amount of Skew)

Reference to FIG. 8, the skew detection unit 33 detects amounts of skew of the LPHs 6BK to 6Y, respectively. In this embodiment, the skew detection unit 33 is mainly composed by the first sensor 17 and the second sensor 18.

Figure 11A:
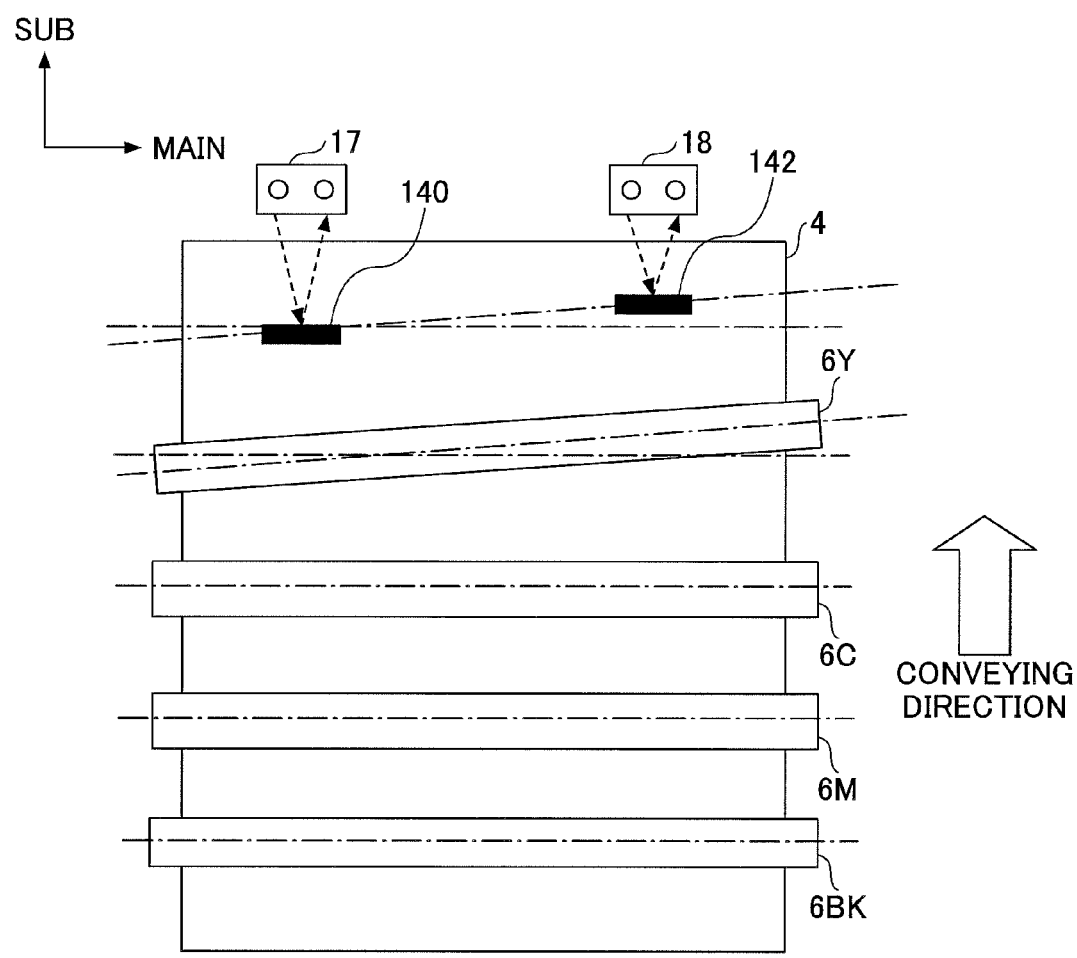
FIG. 11A is a view for explaining an example of detecting amounts of skew of LPHs, respectively.

FIG. 11A is a view for explaining an example of detecting the amounts of skew of the LPHs 6BK to 6Y, respectively.

The first sensor 17 and the second sensor 18 are positioned to face the transfer belt 5 while being apart from each other in the width direction (main scanning direction) of the transfer belt 5. The first sensor 17 and the second sensor 18 respectively include light emitting units and light receiving units. The LPHs 6BK to 6Y respectively form alignment marks at positions where the light emitting units of the first sensor 17 and the second sensor 18 emit the light.

In FIG. 11A, the alignment marks 140 and 142 formed by the LPH 6Y are shown for explanation. Hereinafter, for explanation, an example of detecting the amount of skew of the LPH 6Y is explained. Further, although the LPHs 6BK to 6Y are shown to overlap the recording paper 4 in FIG. 11A, FIG. 11A shows relative positions for explanation. Actually, toner images formed by the LPHs 6BK to 6Y are formed on the photosensitive drums 9BK to 9Y, respectively, and then transferred to the recording paper 4 on the transfer belt 5.

When the light emitting units of the first sensor 17 and the second sensor 18 emit the lights on the alignment marks 140 and 142 formed on the recording paper 4 on the transfer belt 5, the reflected lights are received by the light receiving units of the first sensor 17 and the second sensor 18, respectively. The light receiving units of the first sensor 17 and the second sensor 18 convert the amounts of light to voltage values to output to the skew calculating unit 56.

The lights emitted by the light emitting units of the first sensor 17 and the second sensor 18 are easily reflected on the recording paper 4 on the transfer belt 5 while hardly reflected on the alignment marks 140 and 142. Thus, the amounts of light received by the light receiving units of the first sensor 17 and the second sensor 18 are decreased when the lights are emitted on the alignment marks 140 and 142, respectively.

Figure 11B:
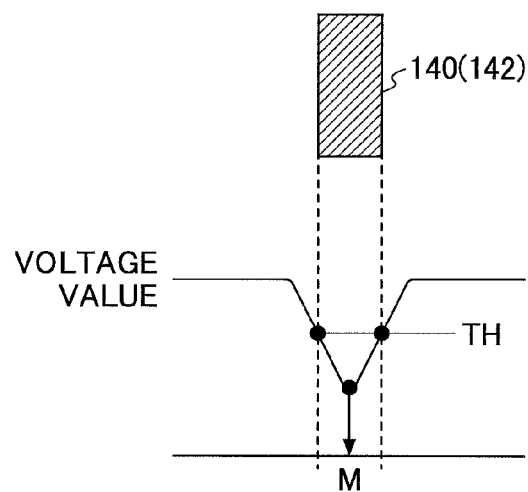
FIG. 11B is a view showing an example of a voltage value converted based on the light received by the a receiving unit of a first sensor or a second sensor.

FIG. 11B shows an example of a voltage value converted based on the light received by the light receiving unit of the first sensor 17 or the second sensor 18.

As described above, the voltage value becomes lower when the light emitted by the light emitting unit of the first sensor 17 or the second sensor 18 is irradiated on the alignment mark 140 or 142, respectively. Thus, the position of the alignment mark 140 or 142 can be defined at a position (or a timing) when the detected voltage value becomes the minimum value. The skew detection unit 33 may determine that the edges of the alignment mark 140 or 142 are detected when the detected voltage values become equal to a predetermined threshold value (shown as "TH" in FIG. 11B). Then, the skew detection unit 33 may detect the middle point (shown as "M" in FIG. 11B) of two edges as the position of the alignment mark 140 or 142.

Thus, the skew detection unit 33 detects the positions of the alignment marks 140 and 142 formed on the transfer belt 5.

Figure 15:
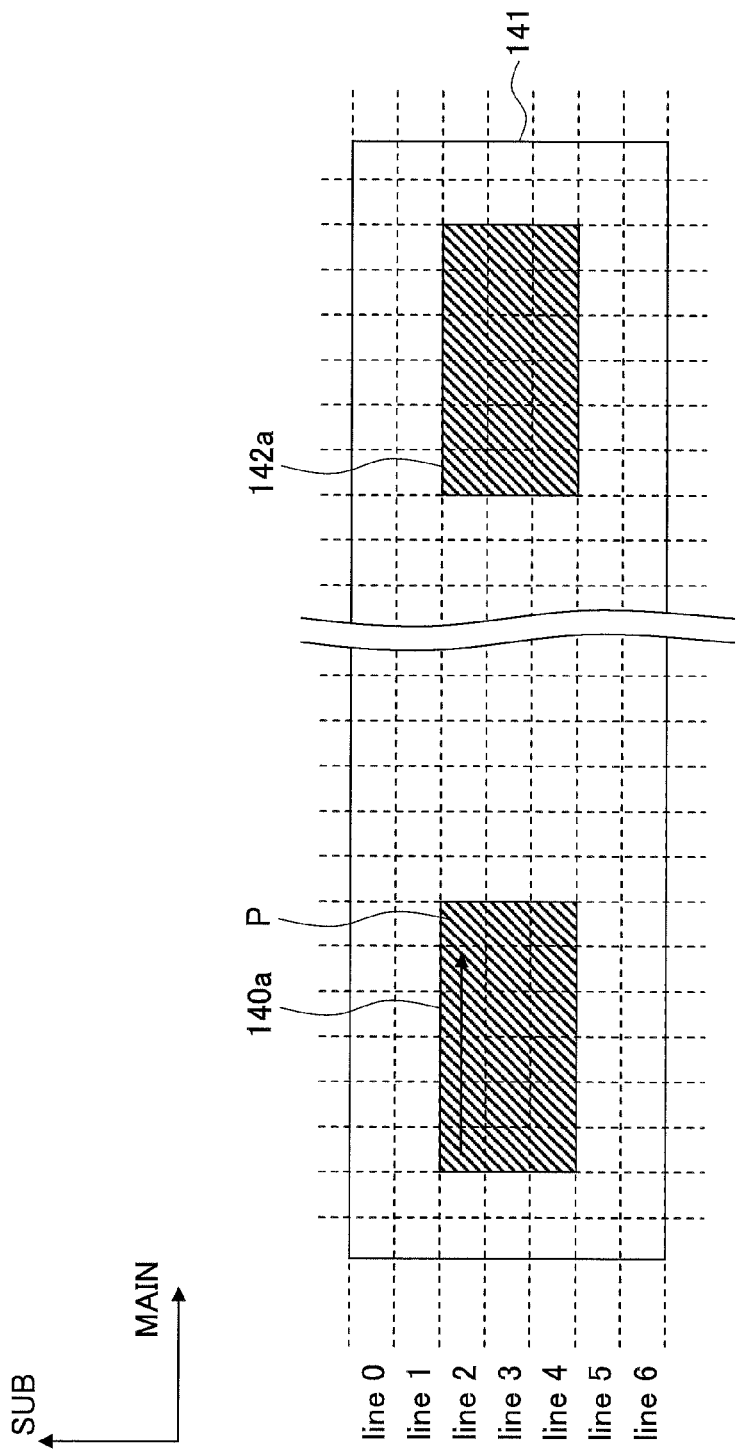
FIG. 15 shows an example of image data for forming alignment marks.

In this embodiment, the alignment marks 140 and 142 or the like are formed with use of the displacement correction based on the correcting values set in the correcting amount setting register 54. Referring back to FIG. 8, the mark forming unit 55 forms the alignment marks 140 and 142 based on the correcting values set in the correcting amount setting register 54. Image data for forming the alignment marks 140 and 142 are previously stored in the line memory 38. FIG. 15 shows an example of image data 141 for forming the alignment marks 140 and 142. The image data 141 includes data 140*a* and 142*a* corresponding to the alignment marks 140 and 142, respectively. The mark forming unit 55 reads the image data 141 for forming the alignment marks from the line memory 38 to form the alignment marks 140 and 142 on the recording paper 4 on the transfer belt 5.

The mark forming unit 55 reads the setting values in the reg1 to reg207 of the correcting amount setting register 54 in order at every 24 clocks of the clock signal. When the read setting value indicates correction is unnecessary, the mark forming unit 55 reads the pixel values of the 24 pixels in the current line from the line memory 38.

When the read setting value of the correcting amount setting register 54 indicates correction is necessary, the mark forming unit 55 reads pixel values of the 24 pixels in other lines (1 to 4 lines in the forward direction or 1 to 4 lines in the backward direction) in the sub-scanning direction based on the read setting value. For example, with reference to FIG. 15, when the mark forming unit 55 is reading the pixel values of the pixels in "line 2", and it is determined that correction is necessary and the image is to be shifted 1 line in the backward direction of the sub-scanning direction at the pixel "P", the mark forming unit 55 reads the pixel value in the "line 1" as a result of shifting the pixels at the same position in the main scanning direction as the pixel "P" in the backward direction, instead of reading the pixel value of the pixel "P".

When the mark forming unit 55 reads the pixel values of 1 line in accordance with the setting values in the reg1 to reg207 of the correcting amount setting register 54, the mark forming unit 55 controls the LPH 6Y to emit light for forming the image of the line. With this, the alignment marks for which the displacement of the LED chips 120*a* to 120*d* of the LPH 6Y is corrected are formed on the recording paper 4 on the transfer belt 5.

Referring to FIG. 8, the skew calculating unit 56 calculates the amount of skew of the LPH 6Y based on the relative positions between the alignment marks 140 and 142. The amount of skew may be expressed by the shift distance (or time) of the alignment mark 142 with respect to the alignment mark 140, which is defined as a reference, in the sub-scanning direction. For example, when the alignment mark 142 is detected "α" seconds after the alignment mark 140 is detected, the amount of skew may be expressed as "k*α" ("k" is a constant for calculating distance), and when the alignment mark 142 is detected "α" seconds before the alignment mark 140 is detected, the amount of skew may be expressed as "−k*α". Alternatively, the amount of skew may be expressed by an angle.

Although the case of the LPH 6Y is explained here, the skew detection unit 33 performs this operation for the LPHs 6BK, 6M, and 6C as well. The skew calculating unit 56 calculates the amounts of skew for each color.

Further, alternatively, the alignment marks 140 and 142 may be composed of a single mark extending through positions to be read by the first sensor 17 and the second sensor 18.

(Selection of Dithering Pattern)

The dithering pattern storing unit 52 stores plural patterns having different screen angles (15°, 30°, 45° and 60°, for example in this embodiment). The screen angle selecting unit 57 selects the dithering patterns based on their screen angles.

Specifically, after the amounts of skew for the LPHs 6BK to 6Y are detected, the screen angle selecting unit 57 selects the dithering patterns for the colors based on the detected amounts of skew for the respective LPHs 6BK to 6Y and the screen angles of the corresponding dithering patterns. In this embodiment, the screen angle selecting unit 57 selects the dithering patterns for the colors such that the larger the amount of skew, the smaller the screen angle of the dithering pattern becomes.

For example, when the amount of skew of the LPH 6BK "Sk_B" is 20 μm, the amount of skew of the LPH 6M "Sk_M" is 40 μm, the amount of skew of the LPH 6C "Sk_C" is 10 μm, and the amount of skew of the LPH 6Y "Sk_Y" is 80 μm, the relationship between the amounts of skew becomes; Sk_Y>Sk_M>Sk_B>Sk_C. In this case, the screen angle selecting unit 57 selects the dithering pattern with the screen angle of 15° for image data of yellow, the dithering pattern with the screen angle of 30° for image data of magenta, the dithering pattern with the screen angle of 45° for image data of black, and the dithering pattern with the screen angle of 60° for image data of cyan.

(Overlap of Errors)

As described above, the skew calculating unit 56 calculates the amount of skew, and not only the displacement correction but also the skew correction is performed. However, as will be explained in the following, if the amount of skew is directly corrected, there may be an overlap of errors.

For a method of performing the skew correction by shifting the scanning position in the sub-scanning direction (shifting a timing for irradiating the light), the minimum shifting amount in the sub-scanning direction becomes 1 line. Even when the resolution of the image in the sub-scanning direction is 600 dpi, the resolution of the image can be made higher by interpolating pixel values in the sub-scanning direction when the LPHs 6BK to 6Y form latent images on the corresponding photosensitive drums 9BK to 9Y. However, even in such a case, the minimum shifting amount in the sub-scanning direction becomes 1 line in the increased resolution.

For example, by emitting light four times for one pixel in the sub-scanning direction, the resolution of an image of 600 dpi is increased to 2400 dpi in the sub-scanning direction. In this case, the minimum shifting amount in the sub-scanning direction becomes about 10 μm. Therefore, when the amount of skew of the LPH 6Y, for example, is 100 μm, which corresponds to 10 lines, the amount of skew can be corrected by dividing the LED chips in the main scanning direction into 10 blocks and shift each of the blocks 1 line in the sub-scanning direction. Here, the blocks are formed not to separate the LED chips in the same group.

Here, when the minimum shifting amount is 10 μm, there may be error of 10 μm at maximum.

FIG. 12A is a view for explaining an example of a mechanism for generation of error by the skew correction.

The positions of the pixels are not corrected until the amount of skew becomes greater than or equal to 10 μm, which is the minimum shifting amount in the sub-scanning direction, so that error may be 10 μm at maximum.

FIG. 12B is a view for explaining the generation of the error by the skew correction in detail.

When the amount of skew "Δa" of the LPH 6Y is 100 μm in the forward direction of the sub-scanning direction and 1 line corresponds to 10 μm, the LED chips of the LPH 6Y are divided into 10 blocks in the main scanning direction so that each of the blocks is shifted "Δa/10"=10 μm, which is equal to 1 line from the proximate block. In such a case, the LED chips included in the second block B2 are shifted in the backward direction of the sub-scanning direction for 1 line while the LED chips included in the third block B3 are shifted in the backward direction of the sub-scanning direction for 2 lines. Therefore, although the last LED chip "B2L" in the second block B2 and the first LED chip "B3F" in the third block B3 are adjacent to each other and their distance in the sub-scanning direction may be not so large, their emitted positions in the sub-scanning direction may be different for 10 μm at maximum. This causes degradation in image quality.

Further, as described above, when the image forming apparatus 100 performs the displacement correction of the LED chips, the error of the amount of displacement in measuring, which is stored in the EEPROM, is further added. For example, as described above with reference to FIG. 7, when the amount of displacement is expressed by 1 pitch (10 μm) as minimum, there may be error of 5 μm to 14 μm (when half-adjusted) for each of the amounts of displacement of 1 pitch. Thus, when correcting the amount of displacement of 1 pitch (10 μm), that may include −5 μm to +4 μm error.

Therefore, when performing the displacement correction and the skew correction for the same pixel, the errors of two corrections are added so that the error may become larger. It means that there may be a case where 10 μm error by the skew correction and 4 μm error by the displacement correction are overlapped for one pixel (there may be a case where those errors compensate for each other). Therefore, there may be a case where the image quality is lowered by performing the corrections.

Therefore, according to this embodiment, the skew correction is limited as follows.

(Limitation of Skew Correction)

The maximum value for a total amount of skew correction is previously set and stored in the maximum value storing unit 34. When the amount of skew calculated by the skew calculating unit 56 exceeds the maximum value, the skew correction adjusting unit 59 sets the maximum value as the total amount of skew correction. Specifically, the skew correction adjusting unit 59 determines whether the amount of skew calculated by the skew calculating unit 56 exceeds the maximum value. Then, when the amount of skew exceeds the maximum value, the skew correction adjusting unit 59 sets the maximum value as the total amount of skew correction. When the amount of skew is less than or equal to the maximum value, the skew correction adjusting unit 59 sets the detected amount of skew as the total amount of skew correction. With this, the error can be reduced to a certain value such that the decreasing of the image quality by dithering can be reduced, thereby, maintaining image quality.

Further, the maximum value of the total amount of skew correction is determined based on the screen angle of the dithering pattern.

FIG. 16 shows an example of the maximum values of the total amounts of skew correction stored in the maximum value storing unit 34.

For example, the maximum values of the total amounts of skew correction for the dithering patterns 1 to 4 with screen angles of 15°, 30°, 45° and 60° are set as 60 μm, 50 μm, 40 μm, and 30 μm, respectively. Further, as described above, the dithering pattern 1 with 15° is applied for yellow, the dithering pattern 2 with 30° is applied for magenta, the dithering pattern 3 with 45° is applied for black, and the dithering pattern 4 with 60° is applied for cyan.

In this case, the skew correction adjusting unit 59 compares the calculated amount of skew Sk_Y=80 μm with the maximum value 60 μm for the dithering pattern 1 with 15°. At this time, the calculated amount of skew Sk_Y=80 μm exceeds the maximum value 60 μm. Therefore, the skew correction adjusting unit 59 determines to limit the correcting value for yellow to be 60 μm, which is the maximum value of the correcting value for the skew correction set in the maximum value storing unit 34.

Similarly, the skew correction adjusting unit 59 compares the calculated amount of skew Sk_M=40 μm with the maximum value 50 μm for the dithering pattern 2 with 30°. At this time, the calculated amount of skew Sk_M=40 μm is smaller than the maximum value 50 μm. Therefore, the skew correction adjusting unit 59 determines to use the calculated amount of skew Sk_M=40 μm.

Similarly, the skew correction adjusting unit 59 compares the calculated amount of skew Sk_B=20 μm with the maximum value 40 μm for the dithering pattern 3 with 45°. At this time, the calculated amount of skew Sk_B=20 μm is smaller than the maximum value 40 μm. Therefore, the skew correction adjusting unit 59 determines to use the calculated amount of skew Sk_B=20 μm.

Similarly, the skew correction adjusting unit 59 compares the calculated amount of skew Sk_C=10 μm with the maximum value 30 μm for the dithering pattern 4 with 60°. At this time, the calculated amount of skew Sk_C=10 μm is smaller than the maximum value 30 μm. Therefore, the skew correction adjusting unit 59 uses the calculated amount of skew Sk_C=10 μm.

In this embodiment, the predetermined maximum values are set such that the larger the screen angle, the smaller the predetermined maximum value becomes.

The skew amount setting unit 58 calculates the amount of skew correction for each of the groups based on thus obtained limited value of the total amount of skew correction, and stores the amounts of skew correction in the correcting amount setting register 54. With this, the skew correction in addition to the displacement correction is performed.

For example, when the total amount of skew correction is 50 μm in the forward direction of the sub-scanning direction and the minimum shifting amount is 10 μm, the pixels may be shifted for 5 pitches in the sub-scanning direction at maximum. Therefore, the registers reg1 to reg207 are divided into 5 blocks in the main scanning direction, and the amount of correction of 1 pitch in the backward direction of the sub-scanning direction with respect to the proximate block is set at the reg40, the reg80, the reg120, the reg160 and the reg200, respectively. With this, the amount of skew is set in the correcting amount setting register 54 in addition to the amount of displacement.

The image forming control unit 60 forms an image based on the setting values set in the correcting amount setting register 54. Similar to the operation by the mark forming unit 55 explained above with reference to FIG. 15, the image forming control unit 60 forms the image while shifting the pixels to read in the sub-scanning direction based on the set values set in the correcting amount setting register 54 for each 24 pixels divided in the main scanning direction. The image forming control unit 60 reads the image data for 1 line.

Alternatively, the image forming apparatus 100 may further include another register for skew correction in addition to the correcting amount setting register 54 for the displacement correction. In this case, the image forming control unit 60 may read the setting values in the correcting amount setting register 54 and the setting values in the correcting amount setting register for the skew correction and add them to determine the shifting amount in the sub-scanning direction.

(Operation)

FIG. 13 is a flowchart showing an example of an operation of the image forming apparatus 100 performing the displacement correction and the skew correction.

When the power of the image forming apparatus 100 is on, the process starts.

First, the displacement amount obtaining unit 53 obtains the amount of displacement for each of the LED chips by reading the amounts of displacement from the displacement amount storing unit 51 (S10).

The displacement amount obtaining unit 53 calculates the setting values for the groups to be set in the corresponding registers reg1 to reg207 based on the reference set position (S20).

The displacement amount obtaining unit 53 sets the calculated setting values in the correcting amount setting register 54 (S30).

Then, the mark forming unit 55 forms the alignment marks on the recording paper 4 while correcting the displacement of the LED chips based on the setting values set in the correcting amount setting register 54 (S40). With this, the amount of skew regardless of the amount of displacement can be calculated.

The skew calculating unit 56 calculates the amount of skew based on the positional differences between two alignment marks (for example, 140 and 142 as shown in FIG. 11A) detected by the skew detection unit 33 (S50). These operations are performed for each of the colors.

Then, the screen angle selecting unit 57 selects the dithering patterns for each of the LPHs 6BK to 6Y such that the larger the amount of skew, the smaller the screen angle becomes (S60).

Subsequently, the skew correction adjusting unit 59 reads the maximum value for the total amount of skew correction corresponding to the screen angle of the dithering pattern from the maximum value storing unit 34 and limits the total amount of skew correction not to exceed the maximum value (S70).

The skew amount setting unit 58 calculates the setting correcting value for each of the groups of the LED chips based on the total amount of skew correction limited in step S70 to add to the setting values for the displacement correction set in the correcting amount setting register 54 (S80).

As described above, according to the image forming apparatus 100 of the embodiment, as screen angles of the dithering patterns are determined based on the amounts of skew, and the total amounts of skew correction are limited to be lower or equal to the predetermined maximum values when correcting skew in the sub-scanning direction, the decreasing of image quality can be reduced even when image processing such as dithering or the like is performed.

Alternative Example

FIG. 14 is a flowchart showing another example of an operation of the image forming apparatus 100 performing the displacement correction and the skew correction.

In the process shown in FIG. 14, the operation of step S70 in FIG. 13 is different. The same operations as those shown in FIG. 13 are not repeated. For the example explained above with reference to FIG. 13, the maximum value for the amount of skew correction is limited in step S70. However, instead of step S70, in step S72 shown in FIG. 14, the skew amount setting unit 58 adjusts the position for performing the skew correction in the main scanning direction as follows.

The skew amount setting unit 58 determines the amount of skew correction for each of the groups based on the total amount of skew correction and the amount of displacement of each of the LED chips of the print head and adjusts the amount of skew correction for each of the groups such that when a first change point, which is a boundary between the groups at which the amount of skew correction changes, overlaps a second change point, which is a boundary between the groups at which the amount of displacement changes, the first change point is shifted to another boundary between the groups which is in the vicinity of the previous boundary in the main scanning direction.

For example, it is assumed that the amount of skew Sk_C for cyan is 10 μm. In this case, the skew amount setting unit 58 shifts one line (for 2400 dpi) in the sub-scanning direction at the boundary between the 13th LED chip and the 14th LED chip (at the reg104), for example. Here, if the change point for the displacement correction is the 14th LED chip (at the reg104) as well, the amount of correction to the 14th LED chip with respect to the 13th LED chip, for example, becomes the total of the amount of skew correction and the amount of displacement correction. In such a case, as described above, the errors may overlap to degrade the image quality.

Thus, according to this example as shown in FIG. 14, the skew amount setting unit 58 shifts the change point for the skew correction when the change points for the skew correction and the displacement correction are the same. For example, for the above case, the skew correction is to be performed at the 2497th dot (reg104) based on the result of calculation; however, according to this example, the skew amount setting unit 58 shifts the register for performing the skew correction at the proximate register (2473rd) or the subsequent register (2521st dot).

The skew correction information storing unit 35 shown in FIG. 4 stores information about how to shift the change point when it is necessary for the skew amount setting unit 58 to shift the change point for the skew correction. The information stored in the skew correction information may include the direction to which the change point is shifted, the shifting amount, or the like.

The skew amount setting unit 58 may detect the change point for the displacement correction based on the displacement table 130 shown in FIG. 7 (when the value other than zero is stored) or the setting values of the correcting amount setting register 54 (where the MSB of the corresponding register is "1"). Then, the skew amount setting unit 58 may determine the register to be the change point for the skew correction based on the information stored in the skew correction information storing unit 35.

This operation of the skew amount setting unit 58 is explained in detail with reference to FIG. 17A to FIG. 17D. FIG. 17A to FIG. 17D are views for explaining the operation of the skew amount setting unit 58. FIG. 17A to FIG. 17D are schematic illustrative views for explanation.

Figure 17A:
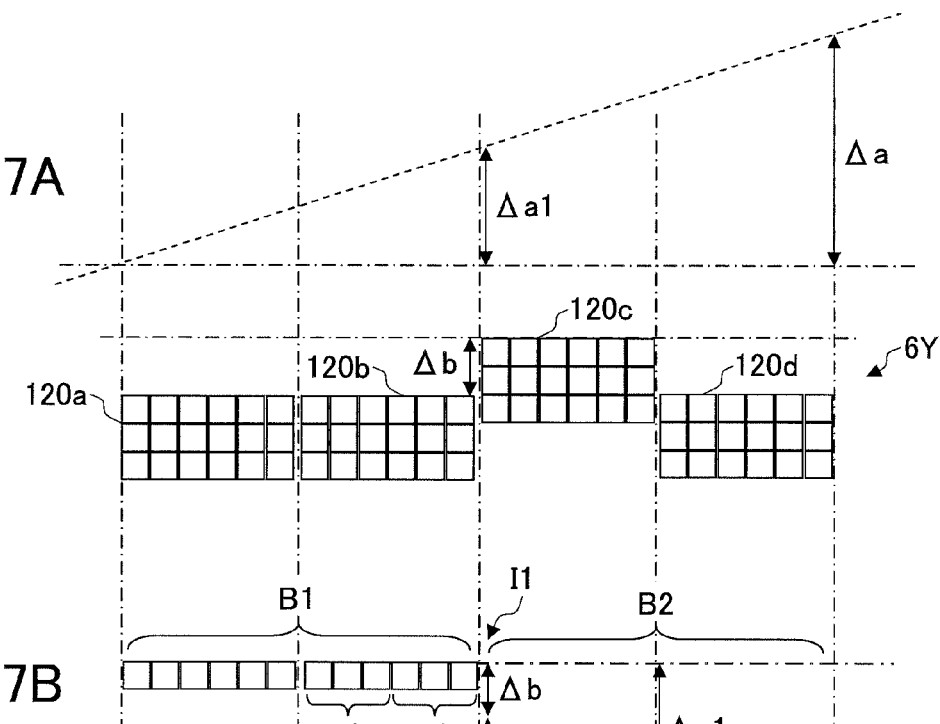
FIG. 17A to FIG. 17D are views for explaining the operation of a skew amount setting unit.

As shown in FIG. 17A, it is assumed that the LPH 6Y includes the LED chips 120a to 120d, the amount of skew is Δa which corresponds to 2 lines, the LED chip 120c is displaced by Δb with respect to other LED chips 120a, 120b, and 120d, the LEDs in each of the LED chips 120a to 120d are divided into 2 groups where the LED chip 120b includes groups g0 and g1, the LED chip 120c includes groups g2 and g3, and the LED chip 120d includes groups g4 and g5.

Figure 17B:
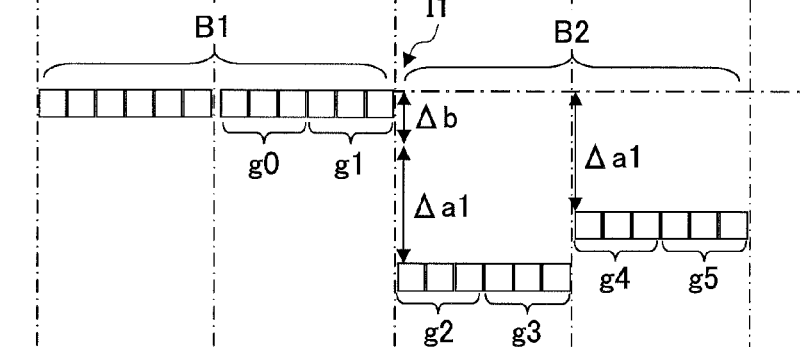

In this case, the LED chips 120a to 120d are to be divided into two blocks B1 and B2 for shifting the LED chips 120c and 120d included in the block B2 for Δa1 (=½ Δa) for the skew correction, as shown in FIG. 17B. Therefore, at this time, the change point for the skew correction becomes the boundary I1 between the group g1 of the LED chip 120b and the group g2 of the LED chip 120c. However, as the LED chip 120c is displaced with respect to the other LED chips 120a, 120b and 120d, the change point for the displacement correction also becomes the boundary I1 between the group g1 of the LED chip 120b and the group g2 of the LED chip 120c. In such a case, the shift amount of the LED chip 120c with respect to the LED chip 120b becomes the total of Δa1+Δb.

Figure 17C:
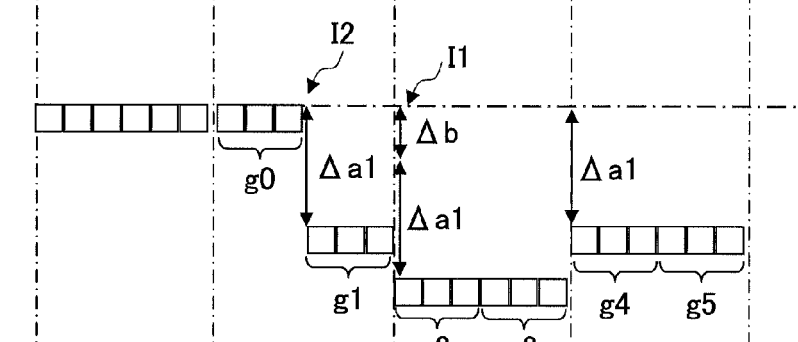
Figure 17D:
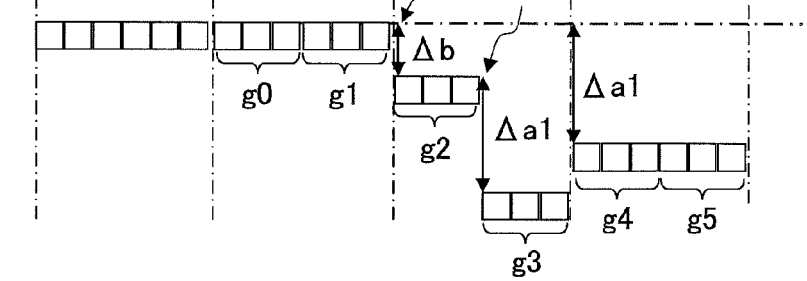

Thus, the skew amount setting unit 58 shifts the change point for the skew correction to another boundary between other adjacent groups which is in the vicinity of the previous boundary I1. FIG. 17C shows an example where the change point for the skew correction is shifted to the boundary I2 between the groups g0 and g1, and FIG. 17D shows an example where the change point for the skew correction is shifted to the boundary I3 between the groups g2 and g3. The change point may be shifted further than the example shown in FIG. 17C or FIG. 17D.

With this operation, the change point for the displacement correction and the change point for the skew correction do not overlap so that the errors do not overlap so that the decreasing of image quality can be reduced even when image processing such as dithering or the like is performed.

Figure 3B:
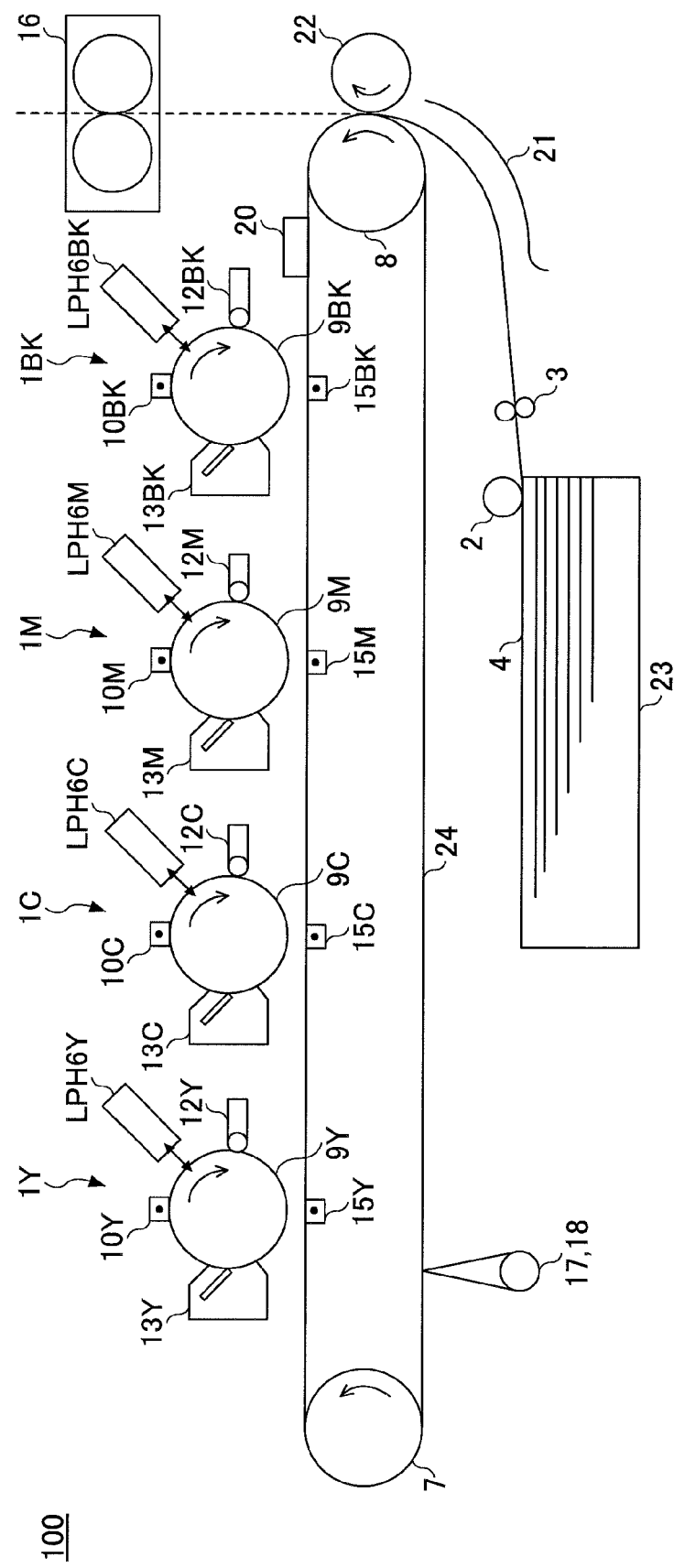
FIG. 3B shows another example of a structure of the image forming apparatus.

FIG. 3B shows another example of a structure of the image forming apparatus 100. FIG. 3B shows an example where an image is primary-transferred onto a middle transfer belt 24.

The image forming apparatus 100 shown in FIG. 3B has almost the same structure as that shown in FIG. 3A. Different points will be explained.

In this example, the image forming apparatus 100 includes the middle transfer belt 24 instead of the transfer belt 5, and a second transfer roller 22. The middle transfer belt 24 is an endless belt and is supported by the driving roller 7 and the driven roller 8. Toner images of each color are transferred on the middle transfer belt 24 at positions (primary transferring position) where the photosensitive drums 9BK, 9M, 9C and 9Y and the middle transfer belt 24 contact by the operation of the transfer units 15BK, 15M, 15C and 15Y, respectively. With this operation, a full-color image where the toners of each color are superposed is formed on the middle transfer belt 24.

The second transfer roller 22 is positioned adjacent to the driven roller 8 to be in contact with the middle transfer belt 24. The second transfer roller 22 is rotated in a clockwise direction. Although not shown in the drawings, the image forming apparatus 100 may include a moving mechanism that moves the second transfer roller 22 to be in contact with the middle transfer belt 24 only at the time of transferring an image.

When forming an image, the recording paper 4 stacked in the paper-feed tray 23 is sent from the upper side, and a full-color toner image is transferred onto the recording paper 4 at a position (second transferring position) where the middle transfer belt 24 and the recording paper 4 make contact. The second transfer roller 22 functions to push the recording paper 4 toward the middle transfer belt 24 to efficiently transfer the full-color toner image on the recording paper 4. Thereafter, after the recording paper 4 passes the second transfer roller 22, the fixing unit 16 fixes the full-color image on the recording paper 4 to be ejected outside the image forming apparatus 100.

For the image forming apparatus 100 shown in FIG. 3B, the method of performing the skew correction and the displacement correction is the same as that explained above with reference to FIG. 3A.

Although in the above embodiment, the image forming apparatus 100 includes the first sensor 17 and the second sensor 18, the image forming apparatus 100 may include three or more sensors which are positioned to be apart from each other in the width direction. In this case, amounts of skew for each of the LPHs may be detected based on sets of two adjacent sensors.

According to the image forming apparatus 100 of the embodiment, the decreasing of image quality can be reduced even when image processing such as dithering or the like is performed.

The present invention is not limited to the specifically disclosed embodiments, and variations and modifications may be made without departing from the scope of the present invention.

The present application is based on Japanese Priority Application No. 2011-88926 filed on Apr. 13, 2011, the entire contents of which are hereby incorporated herein by reference.

What is claimed is:
1. An image forming apparatus comprising:
plural image forming units of corresponding plural colors, each of the image forming units including,
a print head including plural LED chips aligned in a main scanning direction, each of the LED chips including plural LEDs aligned in the main scanning direction, and
a photosensitive body on which light from the print head is received;
a displacement amount obtaining unit that obtains, for each of the colors, an amount of displacement of each of the

LED chips of the print head in a sub-scanning direction with respect to a reference position;

a mark forming unit that forms, for each of the colors, an alignment mark for detecting an amount of skew of the print head with respect to an axis direction of the corresponding photosensitive body while correcting the amount of displacement of the LED chips of the print head;

a skew detection unit that detects, for each of the colors, the amount of skew of the print head;

a screen angle selecting unit that selects screen angles for the plural colors respectively based on the amounts of skew of the plural image forming units detected by the skew detection unit;

an image processing unit that performs image processing on input data to be expressed by pixels of the plural colors such that the pixels of each of the colors have the screen angle selected by the screen angle selecting unit;

a correction amount determining unit that determines a total amount of skew correction based on the amount of skew detected by the skew detection unit, and determines the amount of skew correction in the sub-scanning direction for each of predetermined groups of the pixels for shifting the pixels of the image data corresponding to the group in the sub-scanning direction, based on the total amount of skew correction, for each of the colors; and an image forming control unit that controls forming an image by the plural image forming units based on the image data processed by the image processing unit while correcting the amounts of displacement of the LED chips of the print heads and the skew of the print heads.

2. The image forming apparatus according to claim 1, wherein the screen angle selecting unit selects the screen angles for the plural colors based on the amounts of skew of the corresponding plural image forming units such that the larger the amount of skew the smaller the screen angle becomes.

3. The image forming apparatus according to claim 1, further comprising:
a displacement amount storing unit that stores, for each of the colors, the amounts of displacement of the LED chips of the corresponding print head in the sub-scanning direction with respect to the reference position, and
wherein the displacement amount obtaining unit reads, for each of the colors, the amounts of displacement of the LED chips of the corresponding print head from the displacement amount storing unit.

4. The image forming apparatus according to claim 1, wherein the correction amount determining unit determines, for each of the colors, the total amount of skew correction based on the amount of skew detected by the skew detection unit and a predetermined maximum value, such that the total amount of skew correction does not exceed the predetermined maximum value.

5. The image forming apparatus according to claim 1, wherein the correction amount determining unit determines, for each of the colors, the total amount of skew correction based on the amount of skew detected by the skew detection unit and a predetermined maximum value set in correspondence with the screen angle, such that the total amount of skew correction does not exceed the predetermined maximum value set for the screen angle of the corresponding color.

6. The image forming apparatus according to claim 5, wherein the predetermined maximum values are set such that the larger the screen angle, the smaller the predetermined maximum value becomes.

7. The image forming apparatus according to claim 5, further comprising:
a maximum value storing unit that stores the predetermined maximum values in correspondence with the screen angles, and
wherein the correction amount determining unit reads the predetermined maximum value set for the screen angle of the corresponding color.

8. The image forming apparatus according to claim 1, wherein the correction amount determining unit determines the amounts of skew correction for the groups based on the total amount of skew correction and the amounts of displacement of each of the LED chips of the corresponding print heads and adjusts the amounts of skew correction for the groups such that when a first change point, which is a boundary between adjacent groups at which the amount of skew correction changes, overlaps a second change point which is a boundary between the adjacent groups at which the amount of displacement changes, the first change point is shifted to another boundary between the adjacent groups which is in the vicinity of the previous boundary in the main scanning direction.

9. The image forming apparatus according to claim 8, further comprising:
a skew correction information storing unit that stores information about how to shift the change point when it is necessary for the correction amount determining unit to shift the change point when the first change point, which is a boundary between the groups at which the amount of skew correction changes, overlaps the second change point, which is a boundary between the groups at which the amount of displacement changes,
wherein the correction amount determining unit reads the information about how to shift the change point.

10. The image forming apparatus according to claim 1, wherein the image processing unit performs dithering as the image processing.

11. A method of adjusting an image formed by an image forming apparatus including
plural image forming units of corresponding plural colors, each of the image forming units including,
a print head including plural LED chips aligned in a main scanning direction, each of the LED chips including plural LEDs aligned in the main scanning direction, and
a photosensitive body on which light from the print head is received, comprising:
obtaining, for each of the colors, an amount of displacement of each of the LED chips of the print head in a sub-scanning direction with respect to a reference position;
forming, for each of the colors, an alignment mark for detecting an amount of skew of the print head with respect to an axis direction of the corresponding photosensitive body while correcting the amount of displacement of the LED chips of the print head;
detecting, for each of the colors, the amount of skew of the print head;
selecting screen angles for the plural colors respectively based on the detected amounts of skew of the plural image forming units;

performing image processing on input data to be expressed by pixels of the plural colors such that the pixels of each of the colors have the selected screen angle;

determining, a total amount of skew correction based on the detected amount of skew;

determining the amount of skew correction in the sub-scanning direction for each of predetermined groups of the pixels for shifting the pixels of the image data corresponding to the group in the sub-scanning direction, based on the total amount of skew correction, for each of the colors; and controlling forming an image by the plural image forming units based on the processed image data while correcting the amounts of displacement of the LED chips of the print heads and the skew of the print heads.

* * * * *